US012077017B2

(12) United States Patent
Asano et al.

(10) Patent No.: US 12,077,017 B2
(45) Date of Patent: Sep. 3, 2024

(54) PNEUMATIC TIRE

(71) Applicant: The Yokohama Rubber Co., LTD., Tokyo (JP)

(72) Inventors: Tomohiro Asano, Kanagawa (JP); Hironori Wada, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 519 days.

(21) Appl. No.: 17/294,584

(22) PCT Filed: Aug. 23, 2019

(86) PCT No.: PCT/JP2019/033193
§ 371 (c)(1),
(2) Date: May 17, 2021

(87) PCT Pub. No.: WO2020/110387
PCT Pub. Date: Jun. 4, 2020

(65) Prior Publication Data
US 2022/0009293 A1 Jan. 13, 2022

(30) Foreign Application Priority Data

Nov. 27, 2018 (JP) .................. 2018-221145

(51) Int. Cl.
*B60C 11/13* (2006.01)
*B60C 11/03* (2006.01)

(52) U.S. Cl.
CPC ...... *B60C 11/1315* (2013.01); *B60C 11/0309* (2013.01); *B60C 11/1323* (2013.01);
(Continued)

(58) Field of Classification Search
CPC . B60C 11/0309; B60C 11/042; B60C 11/045; B60C 11/047; B60C 11/1315;
(Continued)

(56) References Cited

U.S. PATENT DOCUMENTS 2,604,920 A * 7/1952 Kirby .................... B60C 11/042
152/900
4,703,788 A * 11/1987 Kusube ................. B60C 11/045
152/DIG. 3
(Continued)

FOREIGN PATENT DOCUMENTS

CN 101157325 A 4/2008
CN 101190645 A 6/2008
(Continued)

OTHER PUBLICATIONS

English machine translation of JP-2005132285-A. (Year: 2005).*
English machine translation of JP-55008904-A. (Year: 1980).*

*Primary Examiner* — Robert C Dye
(74) *Attorney, Agent, or Firm* — Thorpe North & Western

(57) ABSTRACT

A pneumatic tire includes a circumferential main groove extending in a tire circumferential direction in a tread surface of a tread portion, wherein when the circumferential main groove is segmented into an outer side in a tire radial direction and an inner side in the tire radial direction by drawing an imaginary segment line parallel with a straight line connecting each of groove opening edges at a position of ½ of a groove depth in a meridian cross-section, a cross-sectional area SU on the outer side in the tire radial direction and a cross-sectional area SD on the inner side in the tire radial direction satisfy the relationship $0.15 \leq SD/SU \leq 0.60$.

15 Claims, 13 Drawing Sheets

(52) U.S. Cl.
CPC ... *B60C 11/1353* (2013.01); *B60C 2011/0346* (2013.01); *B60C 2011/0362* (2013.01); *B60C 2011/0381* (2013.01); *B60C 2011/039* (2013.01)

(58) Field of Classification Search
CPC ..... B60C 2011/0346; B60C 2011/0381; B60C 2011/0383
See application file for complete search history.

(56) References Cited

U.S. PATENT DOCUMENTS

| | | | | |
|---|---|---|---|---|
| 4,955,416 | A | * | 9/1990 | Takeuchi ................ B60C 3/04 152/454 |
| 5,417,269 | A | | 5/1995 | Kinoshita et al. |
| 6,481,480 | B1 | * | 11/2002 | Schuster ................ B60C 11/11 152/209.27 |
| 2007/0012389 | A1 | * | 1/2007 | Ito ........................ B60C 11/047 152/209.22 |
| 2008/0078487 | A1 | | 4/2008 | Ohara |
| 2008/0128063 | A1 | * | 6/2008 | Ohara ................ B60C 11/042 152/209.19 |
| 2012/0006456 | A1 | * | 1/2012 | Koshio ................ B60C 11/125 152/209.18 |
| 2017/0028791 | A1 | * | 2/2017 | Tanaka ................ B60C 11/047 |
| 2017/0106702 | A1 | * | 4/2017 | Ito ........................ B60C 11/1204 |
| 2017/0253088 | A1 | | 9/2017 | Maehara |

FOREIGN PATENT DOCUMENTS

| | | | |
|---|---|---|---|
| CN | 107150557 A | | 9/2017 |
| DE | 102007047134 A | | 10/2007 |
| DE | 102013107343 A | | 7/2013 |
| DE | 102015202371 A1 | | 8/2016 |
| EP | 3213932 A1 | | 9/2017 |
| JP | 55008904 A | * | 1/1980 |
| JP | 1-215603 A | | 8/1989 |
| JP | 6-183212 A | | 7/1994 |
| JP | 2001-63316 A | | 3/2001 |
| JP | 2005132285 A | * | 5/2005 |
| JP | 2008-87626 A | | 4/2008 |
| JP | 2008-137474 A | | 6/2008 |
| JP | 2013-28202 A | | 2/2013 |
| JP | 2013-43619 A | | 3/2013 |
| JP | 2017-154708 A | | 9/2017 |
| JP | 2018-167664 A | | 11/2018 |
| JP | 2019-93907 A | | 6/2019 |
| KR | 10-2005-0049220 A | | 5/2005 |
| WO | 2015/003837 A1 | | 1/2015 |

* cited by examiner

PNEUMATIC TIRE

TECHNICAL FIELD

The present technology relates to a pneumatic tire.

BACKGROUND ART

In heavy duty pneumatic tires and the like, which are intended to run on a non-paved road and a paved road, stone drilling may be generated due to stone biting in a groove when running on a non-paved road, and tread separation may be generated due to damage to a belt that is an internal structure, and consequently, retreat rate may be lowered.

Related art, for example, Japan Unexamined Patent Publication No. H01-215603, discloses that in order to improve braking performance and steering stability when worn, a longitudinal groove extending in a tire circumferential direction of a tread pattern is provided with a shelf step that protrudes from at least one side wall toward the center portion to narrow a groove width of a lower portion.

As a structure for preventing stone biting, it is generally known to partially provide a projection on a groove bottom or a groove wall. However, when the projection is partially provided, a complicated shape is formed, which, for example, causes defects such as vulcanization failures and makes molding difficult. Thus, a pneumatic tire that can prevent stone biting without having a complicated shape is desired.

SUMMARY

The present technology provides a pneumatic tire that can prevent stone biting without having a complicated shape.

A pneumatic tire according to an aspect of the present technology includes a circumferential main groove extending in a tire circumferential direction in a tread surface of a tread portion, wherein when the circumferential main groove is segmented into an outer side in a tire radial direction and an inner side in a tire radial direction by drawing an imaginary segment line parallel with a straight line connecting each of groove opening edges at a position of ½ of a groove depth in a meridian cross-section, a cross-sectional area SU on the outer side in the tire radial direction and a cross-sectional area SD on the inner side in the tire radial direction satisfy the relationship $0.15 \leq SD/SU \leq 0.60$.

Additionally, in the pneumatic tire according to an aspect of the present technology, when the imaginary segment line is drawn at a ¼ position of the groove depth in a meridian cross-section, the circumferential main groove has a groove width W1 at the ¼ position and a groove width W of the groove opening portion, and preferably satisfies the relationship $W1/W \leq 0.78$.

Additionally, in the pneumatic tire according to an aspect of the present technology, the circumferential main groove preferably includes, in at least one groove wall, an inflection portion where a groove wall angle changes from the groove opening edge toward a groove bottom.

Additionally, in the pneumatic tire according to an aspect of the present technology, the circumferential main groove has a height HT in the tire radial direction from the groove bottom to the inflection portion and a groove depth D, and preferably satisfies the relationship $0.1 \leq HT/D \leq 0.5$.

Additionally, in the pneumatic tire according to an aspect of the present technology, in the circumferential main groove, the groove wall angle with respect to a normal line of the tread surface from the groove opening edge of the groove wall toward the groove bottom preferably satisfies the range of not less than 10° and not greater than 45°.

In the pneumatic tire according to an aspect of the present technology, the circumferential main groove preferably has a zigzag shape that bends in a tire width direction.

Additionally, in the pneumatic tire according to an aspect of the present technology, the circumferential main groove has a pitch length P1 of one period of the zigzag shape and a tire circumferential length TL in the tire circumferential direction, and preferably satisfies the relationship $0.005 \leq P1/TL \leq 0.03$.

Additionally, in the pneumatic tire according to an aspect of the present technology, the circumferential main groove has an amplitude A of one period of the zigzag shape and a tire development width TDW, and preferably satisfies the relationship $0.01 \leq A/TDW \leq 0.05$.

Additionally, the pneumatic tire according to an aspect of the present technology includes a plurality of the circumferential main grooves provided side by side in the tire width direction, wherein positions of bent portions of the zigzag shape of each of the circumferential main grooves adjacent to each other in the tire width direction preferably differ from each other in the tire circumferential direction.

Additionally, the pneumatic tire according to an aspect of the present technology includes a plurality of the circumferential main grooves provided side by side in the tire width direction, and preferably includes a plurality of lug grooves provided side by side in the tire circumferential direction to connect mutual bent portions of the zigzag shapes closest in the tire width direction with respect to two of the plurality of circumferential main grooves adjacent to each other in the tire width direction, and a block defined by the two of the plurality of circumferential main grooves adjacent to each other in the tire width direction and two of the plurality of lug grooves adjacent to each other in the tire circumferential direction.

Additionally, in the pneumatic tire according to an aspect of the present technology, the block preferably includes one broad width portion at the center in the tire circumferential direction and narrow width portions respectively at both ends in the tire circumferential direction.

Additionally, in the pneumatic tire according to an aspect of the present technology, the lug groove preferably includes bent portions at at least two positions.

Additionally, in the pneumatic tire according to an aspect of the present technology, a groove depth DL of the lug groove and a groove depth D of the circumferential main groove to which the lug groove connects preferably satisfy the relationship $DL/D \leq 0.8$.

Additionally, in the pneumatic tire according to an aspect of the present technology, one of the circumferential main grooves defining the block is disposed closer to a tire equatorial plane, and the other of the circumferential main grooves is disposed closer to a tire ground contact edge, and the block includes notch portions respectively connected to each of the circumferential main grooves on both sides in the tire width direction and terminating inside the block, each of the notch portions includes each of inclined portions that is inclined with respect to a normal line of the tread surface toward a groove bottom of each of the circumferential main grooves, and each of the inclined portions has an inclination angle θC toward a groove bottom of the one of the circumferential main grooves and an inclination angle θS toward a groove bottom of the other of the circumferential main grooves and preferably satisfy the relationship $\theta C \leq 20°$ and $\theta C \leq \theta S$.

Additionally, in the pneumatic tire according to an aspect of the present technology, the block includes notch portions respectively connected to the circumferential main grooves on both sides in the tire width direction and terminating inside the block, each of the notch portions includes each of opening portions that connects to each of the circumferential main grooves and is disposed to be misaligned in the tire circumferential direction, and edges of the opening portions on one side preferably match each other in the tire circumferential direction.

Additionally, in the pneumatic tire according to an aspect of the present technology, the block includes notch portions respectively connected to the circumferential main grooves on both sides in the tire width direction and terminating inside the block, and the notch portion is preferably provided to face one end of the lug groove across the circumferential main groove.

Additionally, in the pneumatic tire according to an aspect of the present technology, the maximum height DK of the notch portion in the tire radial direction and the groove depth D of the circumferential main groove to which the notch portion connects preferably satisfy the relationship $0.60 \leq DK/D \leq 0.85$.

Additionally, in the pneumatic tire according to an aspect of the present technology, the circumferential main groove includes a step portion formed in a groove wall at least on a side to which the lug groove connects, and a groove depth DL of the lug groove and a depth DH of the step portion from the tread surface preferably satisfy the relationship $DL/DH \leq 1.1$.

Additionally, in the pneumatic tire according to an aspect of the present technology, a groove that continues from the circumferential main groove to the tire ground contact edge is preferably not disposed on the outer side in the tire width direction of the circumferential main groove provided on the outermost side in the tire width direction.

According to the present technology, stone biting can be prevented without having a complicated shape.

DETAILED DESCRIPTION

Embodiments of the present technology are described in detail below with reference to the drawings. However, the present technology is not limited by the embodiment. Constituents of the embodiment include elements that are essentially identical or that can be substituted or easily conceived by one skilled in the art. Furthermore, the plurality of modified examples described in the embodiment can be combined as desired within the scope apparent to one skilled in the art. In addition, some of the constituents may not be used in some embodiments.

Pneumatic Tire

Figure 1:
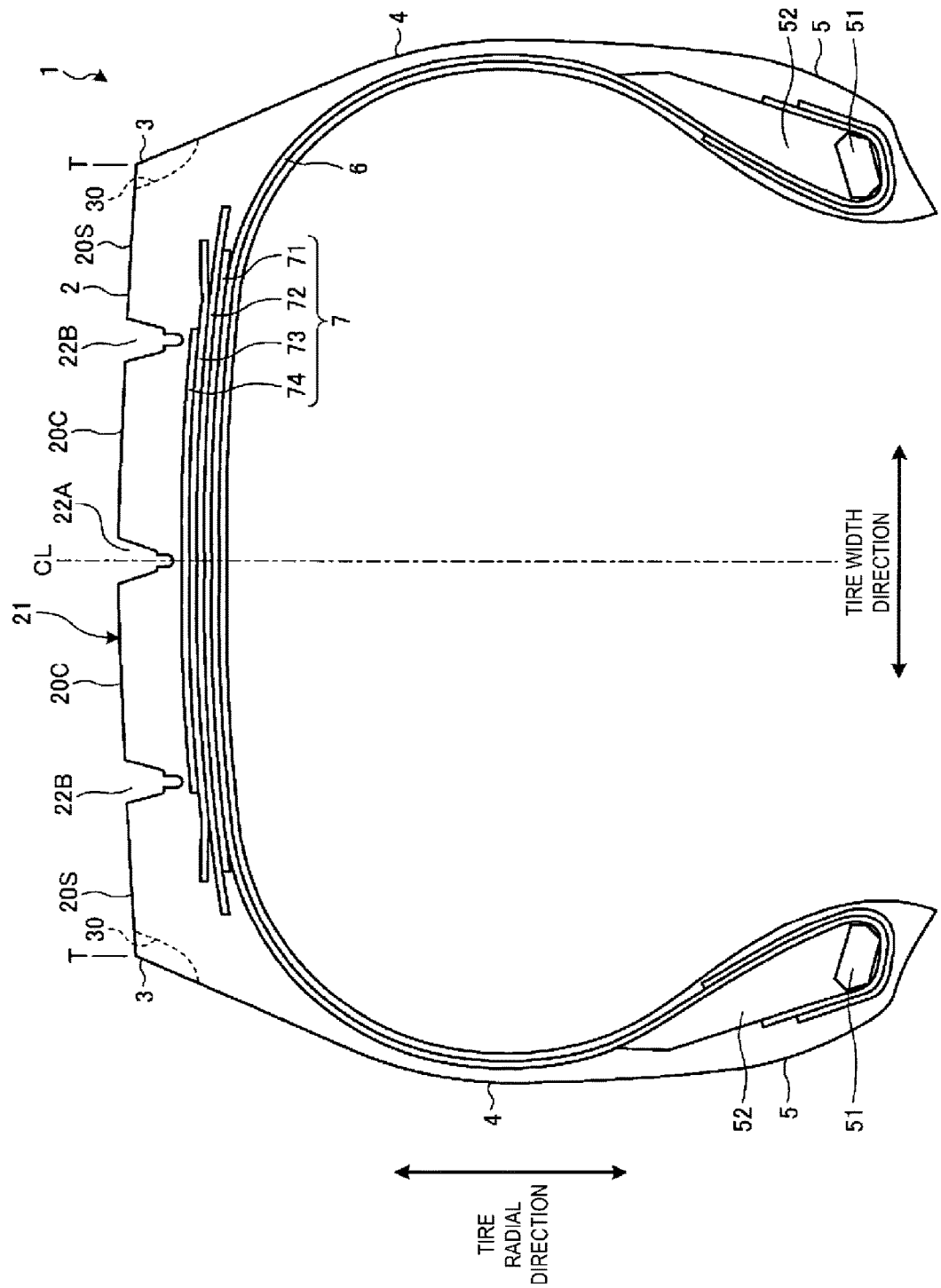
FIG. 1 is a meridian cross-sectional view of a pneumatic tire according to a present embodiment.
Figure 2:
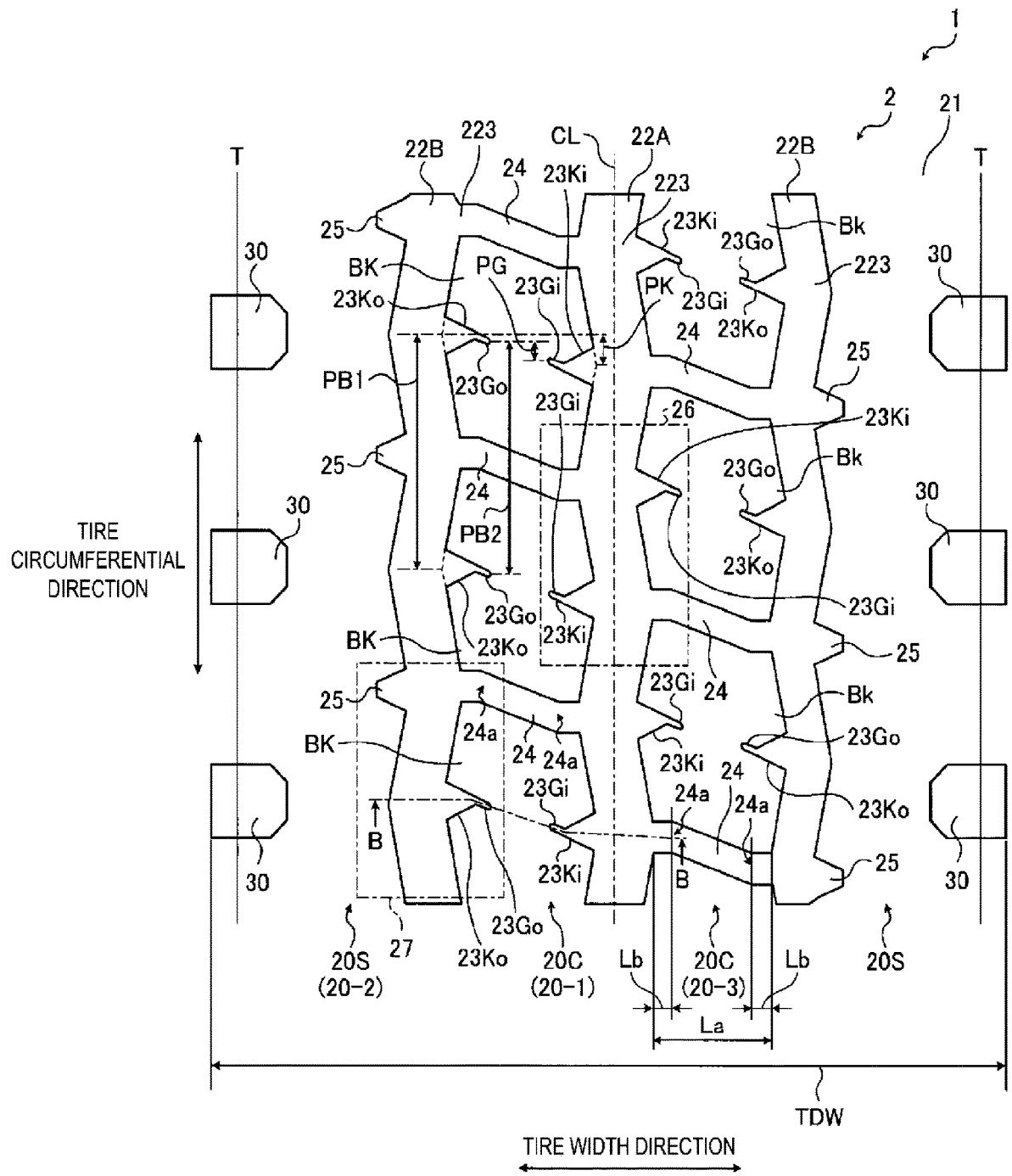
FIG. 2 is a plan view illustrating a tread surface of the pneumatic tire according to the present embodiment.

FIG. 1 is a meridian cross-sectional view of a pneumatic tire 1 according to the present embodiment. FIG. 2 is a plan view of a tread surface of the pneumatic tire 1 according to the present embodiment.

Herein, "tire radial direction" refers to the direction orthogonal to the rotation axis (not illustrated) of a pneumatic tire 1. "Inner side in the tire radial direction" refers to a side toward the rotation axis in the tire radial direction. "Outer side in the tire radial direction" refers to a side away from the rotation axis in the tire radial direction. "Tire circumferential direction" refers to the circumferential direction with the rotation axis as the center axis. Additionally, "tire width direction" refers to a direction parallel with the rotation axis. "Inner side in the tire width direction" refers to a side toward a tire equatorial plane (tire equator line) CL in the tire width direction. "Outer side in the tire width direction" refers to a side away from the tire equatorial plane CL in the tire width direction. "Tire equatorial plane CL" refers to a plane that is orthogonal to the rotation axis of the pneumatic tire 1 and that passes through a center of a tire width of the pneumatic tire 1. "Tire width" is the width in the tire width direction between components located on outer sides in the tire width direction, or in other words, the distance between the components that are the most distant from the tire equatorial plane CL in the tire width direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the pneumatic tire 1 of the present embodiment includes a tread portion 2, shoulder portions 3 on both outer sides in a tire width direction of the tread portion 2, and sidewall portions 4 and bead portions 5 continuously formed in that order from the shoulder portions 3. Furthermore, the pneumatic tire 1 includes a carcass layer 6 and a belt layer 7.

The tread portion 2 is made of a rubber material (tread rubber) and is exposed on the outermost side of the pneumatic tire 1 in the tire radial direction, with the surface thereof constituting the contour of the pneumatic tire 1. A tread surface 21 is formed on an outer circumferential surface of the tread portion 2, in other words, on a road contact surface that comes into contact with a road surface when running. A plurality (three in the present embodiment) of circumferential main grooves 22A, 22B that extend in the tire circumferential direction are provided in the tread surface 21. A plurality (four in the present embodiment) of land portions 20C, 20S defined by the plurality of circumferential main grooves 22A, 22B, extending in the tire circumferential direction, and arranged in the tire width direction are provided in the tread surface 21.

The circumferential main groove 22A is the inner circumferential main groove closest to the tire equator line CL. In the present embodiment, the circumferential main groove 22A is disposed on the tire equator line CL. The circumferential main groove 22B is the circumferential main groove that is second closest to the tire equator line CL. The circumferential main groove 22B is an outer circumferential main groove provided on the outer side in the tire width direction of the circumferential main groove 22A, which is the inner circumferential main groove. No other circumferential main grooves are provided between the circumferential main groove 22A and the circumferential main groove 22B. "Main groove" refers to a groove on which a wear indicator must be provided as specified by JATMA (The Japan Automobile Tyre Manufacturers Association, Inc.).

The land portion 20C is defined between the circumferential main groove 22A and the circumferential main groove 22B. The land portion 20C includes a lug groove 24 that connects to the circumferential main groove 22A and the circumferential main groove 22B to join the circumferential main groove 22A and the circumferential main groove 22B. A plurality of the lug grooves 24 extend in a direction intersecting the circumferential main groove 22A and 22B, and are provided side by side in the tire circumferential direction. The land portion 20S is defined on the outer side in the tire width direction of the circumferential main groove 22B, and is disposed on the outermost side in the tire width direction of the tread portion 2. The land portion 20S includes lug grooves 30 on an edge portion on the outer side in the tire width direction of the circumferential main groove 22B. The lug grooves 30 are provided in the land portions 20S at a predetermined pitch in the tire circumferential direction. An end portion of each of the lug grooves 30 on the side closer to the tire equatorial plane CL terminates in the land portion 20S. An end portion of each of the lug grooves 30 on the side farther from the tire equatorial plane CL extends beyond the tire ground contact edge T in the tire width direction and opens to the shoulder portion 3. The lug groove is a lateral groove extending in the tire width direction, and opens when the tire comes into contact with the ground, and functions as a groove.

The tire ground contact edge T is defined as the maximum width position in the tire axial direction of the contact surface between the tire and a flat plate when the tire is mounted on a specified rim, inflated to the specified internal pressure, placed perpendicular to the flat plate in a static state without being loaded, and loaded with a load corresponding to the specified load.

"Specified rim" refers to a "standard rim" defined by JATMA, a "Design Rim" defined by TRA (The Tire and Rim Association, Inc.), or a "Measuring Rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA, or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO.

In FIG. 1, the shoulder portions 3 are portions of the tread portion 2 located on both outer sides in the tire width direction. Additionally, the sidewall portions 4 are exposed on the outermost sides of the pneumatic tire 1 in the tire width direction. The bead portions 5 each include a bead core 51 and a bead filler 52. The bead core 51 is formed by winding a bead wire, which is a steel wire, into an annular shape. The bead filler 52 is a rubber material disposed in a space formed when an end portion in the tire width direction of the carcass layer 6 is folded back toward the outer side in the tire width direction at the position of the bead core 51.

The end portions of the carcass layer 6 in the tire width direction are folded back around the pair of bead cores 51 from an inner side to an outer side in the tire width direction, and the carcass layer 6 is stretched in a toroidal shape in the tire circumferential direction to form the framework of the tire. The carcass layer 6 is made of coating rubber-covered carcass cords (not illustrated) disposed side by side with an angle with respect to the tire circumferential direction along the tire meridian direction at an angle with respect to the tire circumferential direction. The carcass cords are made of steel or organic fibers (polyester, rayon, nylon, or the like).

The belt layer 7 has a multilayer structure in which four layers of belts 71, 72, 73, 74 are layered, for example, and in the tread portion 2, is disposed on the outer side in the tire radial direction, which is the outer circumference, of the carcass layer 6, covering the carcass layer 6 in the tire circumferential direction. The belts 71, 72, 73, 74 are made of coating rubber-covered cords (not illustrated) disposed side by side at a predetermined angle with respect to the tire circumferential direction. The cords are made of steel or organic fibers (polyester, rayon, nylon, or the like).

The tread portion 2 will be described in detail below. In the following description, the groove depth is the maximum distance from the tread surface to the groove bottom and is measured when the tire is mounted on a specified rim, inflated to the specified internal pressure, and in an unloaded state. Additionally, in a configuration in which the grooves include an uneven portion or sipes on the groove bottom, the groove depth is measured excluding these portions.

(Land Portions)

As illustrated in FIG. 2, in this example, in the land portion 20C of the tread portion 2, blocks BK are defined by the circumferential main grooves 22A, 22B and the lug grooves 24 extending in the tire width direction. Instead of the lug grooves 24, the tread portion 2 may have sipes (not illustrated) extending in the tire width direction. In this case, blocks BK are defined by the circumferential main grooves 22A, the circumferential main grooves 22B, and the sipes thereof. In other words, the tread portion 2 of this example has blocks BK defined by two circumferential main grooves extending in the tire circumferential direction and width direction grooves (lug grooves 24 or sipes) extending in the tire width direction. Sipes provided on the tread portion 2 are notches formed in the tread surface and distinguished from the lug groove in that the sipes close when the tire comes into contact with the ground.

The blocks BK are arranged side by side in the tire circumferential direction on both sides of the tire equator line CL in the tire width direction. Thus, the tread portion 2 of this example constitutes land portions in which the blocks BK are arranged side by side in the tire circumferential direction.

The block BK includes a notch portion (also referred to as an inner notch portion) 23Ki on the edge on the side closer to the tire equator line CL. A shallow groove portion (also referred to as an inner shallow groove portion) 23Gi is connected to the notch portion 23Ki. In addition, the block BK includes a notch portion (also referred to as an outer notch portion) 23Ko on the edge on the side farther from the tire equator line CL. A shallow groove portion (also referred to as an outer shallow groove portion) 23Go is connected to the notch portion 23Ko. By providing the notch portion 23Ki and the shallow groove portion 23Gi, and the notch portion 23Ko and the shallow groove portion 23Go in the edge of the block BK, uneven wear resistance performance can be improved and drainage performance can be improved.

Note that instead of the blocks BK arranged side by side in the tire circumferential direction, rib-shaped land portions that are defined by the circumferential main groove 22A and the circumferential main groove 22B and provided continuously in the tire circumferential direction may be provided in the tread portion 2, and the notch portion 23Ki, the shallow groove portion 23Gi, the notch portion 23Ko, and the shallow groove portion 23Go may be provided in the edge of the land portion.

(Inner Circumferential Main Groove)

Figure 3:
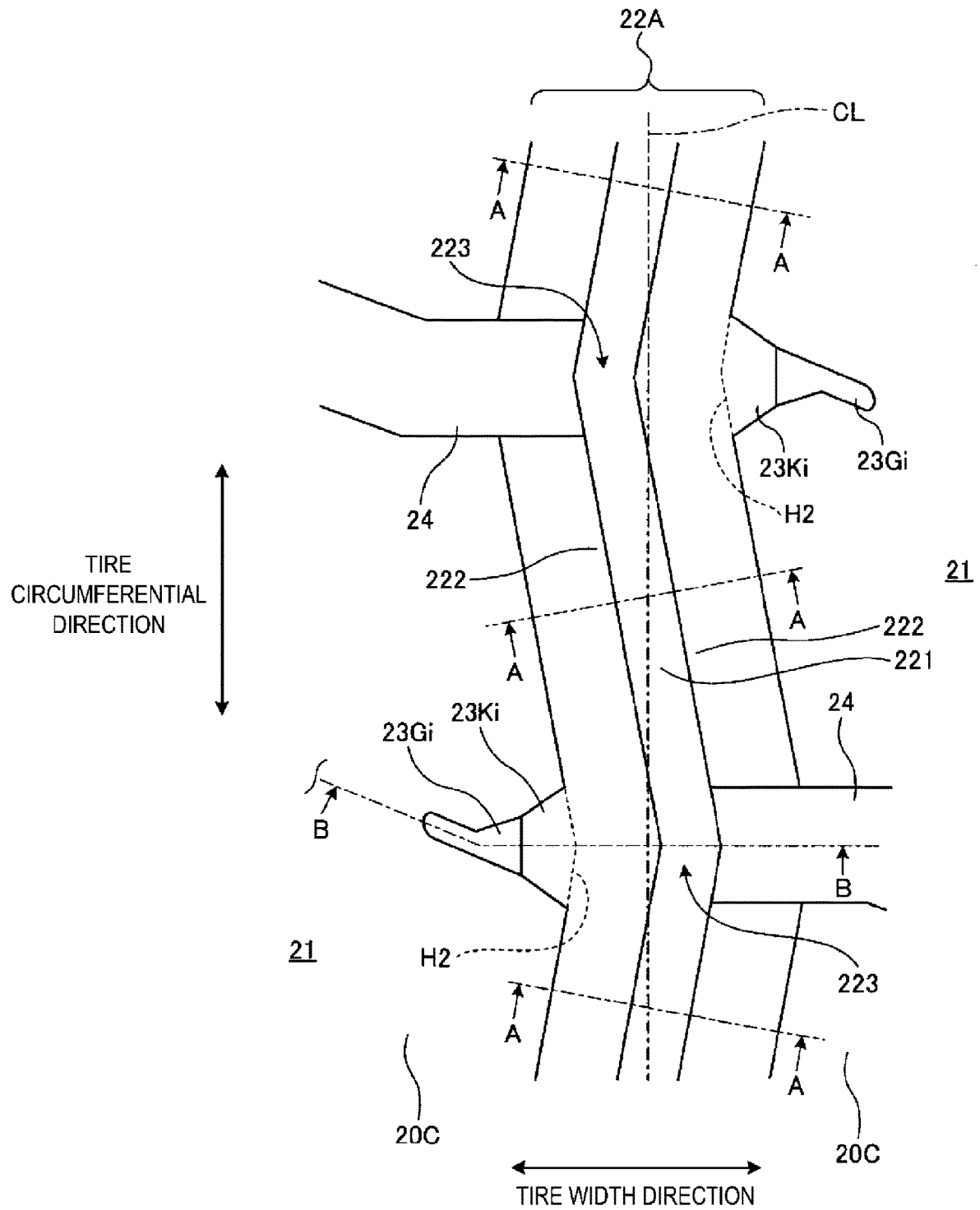
FIG. 3 is a plan view illustrating a detailed configuration of an inner circumferential main groove.

FIG. 3 is a plan view illustrating a detailed configuration of the circumferential main groove 22A, which is an inner circumferential main groove. FIG. 3 is an enlarged view of the region 26 in FIG. 2. As illustrated in FIG. 3, the circumferential main groove 22A extends in the tire circumferential direction along the tire equator line CL. Both sides of the circumferential main groove 22A are land portions 20C.

In this example, the circumferential main groove 22A has a zigzag shape that bends on one side and the other side of the tire equator line CL with the tire equator line CL as a center line. The circumferential main groove 22A is connected to the lug groove 24 in the zigzag-shaped bent portion 223. The land portion 20C that faces the connection portion between the circumferential main groove 22A and the lug groove 24 includes a notch portion 23Ki that connects to the circumferential main groove 22A, and a shallow groove portion 23Gi that connects to the notch portion 23Ki and terminates in the land portion 20C. Note that a dashed line H2 illustrated in FIG. 3 is an imaginary line of the circumferential main groove 22A when the circumferential main groove 22A is viewed in a plan view.

Figure 4:
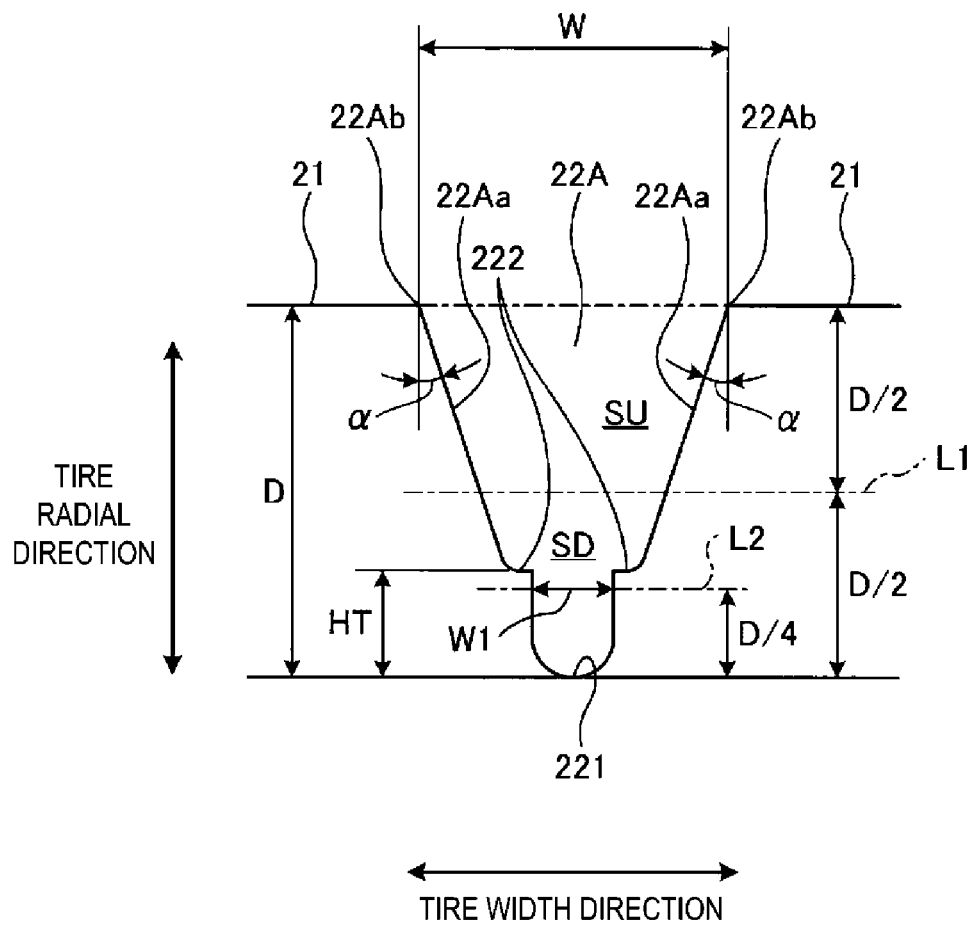
FIG. 4 is a cross-sectional view along line A-A in FIG. 3.

FIG. 4 is a diagram illustrating the structure of the circumferential main groove 22A. FIG. 4 is a cross-sectional view along line A-A in FIG. 3. As illustrated in FIG. 4, the circumferential main groove 22A includes a step portion 222 in the groove wall 22Aa between a tread surface 21 and a groove bottom 221. The step portion 222 extends in the tire circumferential direction. The step portion 222 is provided on at least one of the groove walls 22Aa. The step portion 222 forms an inflection portion in which the groove wall angle α of the groove wall 22Aa changes from a groove opening edge 22Ab of the circumferential main groove 22A toward the groove bottom. The groove wall angle α with respect to the normal line of the tread surface 21 satisfies the range of not less than 10° and not greater than 45° at the groove wall 22Aa from the tread surface 21 that is the groove opening edge 22Ab of the circumferential main groove 22A toward the groove bottom 221 to the step portion 222. In the present example, the groove wall angle α is 18°, for example.

(Outer Circumferential Main Grooves)

Figure 5:
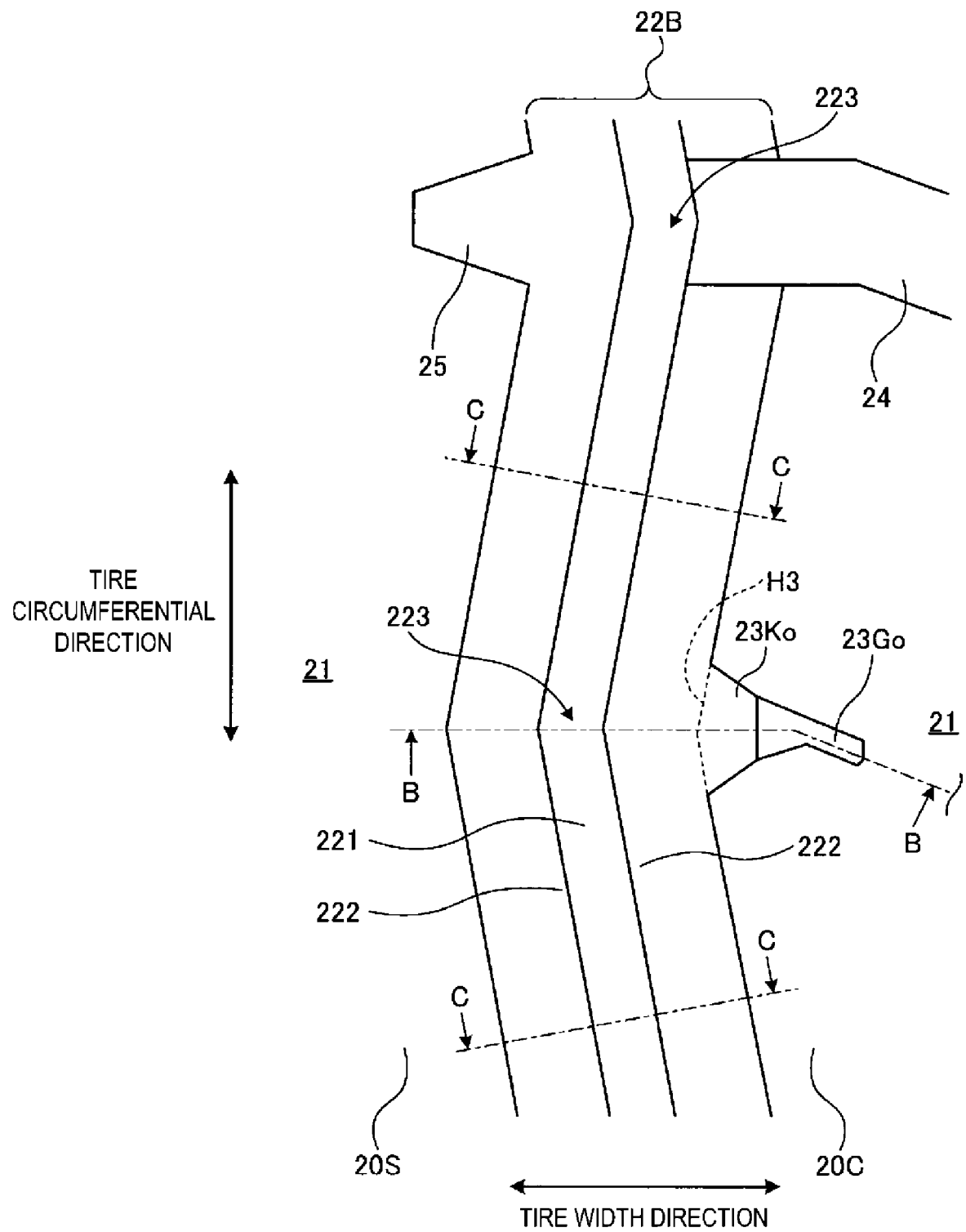
FIG. 5 is a plan view illustrating a detailed configuration of an outer circumferential main groove.

FIG. 5 is a plan view illustrating a detailed configuration of the circumferential main groove 22B which is an outer circumferential main groove. FIG. 5 is an enlarged view of the region 27 in FIG. 2. As illustrated in FIG. 5, the circumferential main groove 22B extends in the tire circumferential direction. Among the land portions on both sides of the circumferential main groove 22B, the land portion 20C is on the side closer to the tire equator line CL and the land portion 20S is on the side farther from the tire equator line CL.

In this example, the circumferential main groove 22B has a zigzag shape that bends at the side closer to the tire equator line CL and the side farther from the tire equator line CL. In the circumferential main groove 22B, on a side of the land portion 20C, the zigzag-shaped bent portion 223 toward the inner side in the tire width direction closer to the tire equator line CL connects to the lug groove 24, and the zigzag-shaped bent portion 223 toward the outer side in the tire width direction farther from the tire equator line CL connects to the notch portion 23Ko.

The land portion 20C includes the notch portion 23Ko connected to the circumferential main groove 22B and the shallow groove portion 23Go connected to the notch portion 23Ko and terminating in the land portion 20C. Note that a dashed line H3 illustrated in FIG. 5 is an imaginary line of the circumferential main groove 22B when the circumferential main groove 22B is viewed in a plan view.

The land portion 20S facing the connection portion between the circumferential main groove 22B and the lug groove 24 includes a notch portion 25. The notch portion 25 terminates in the land portion 20S.

Figure 6:
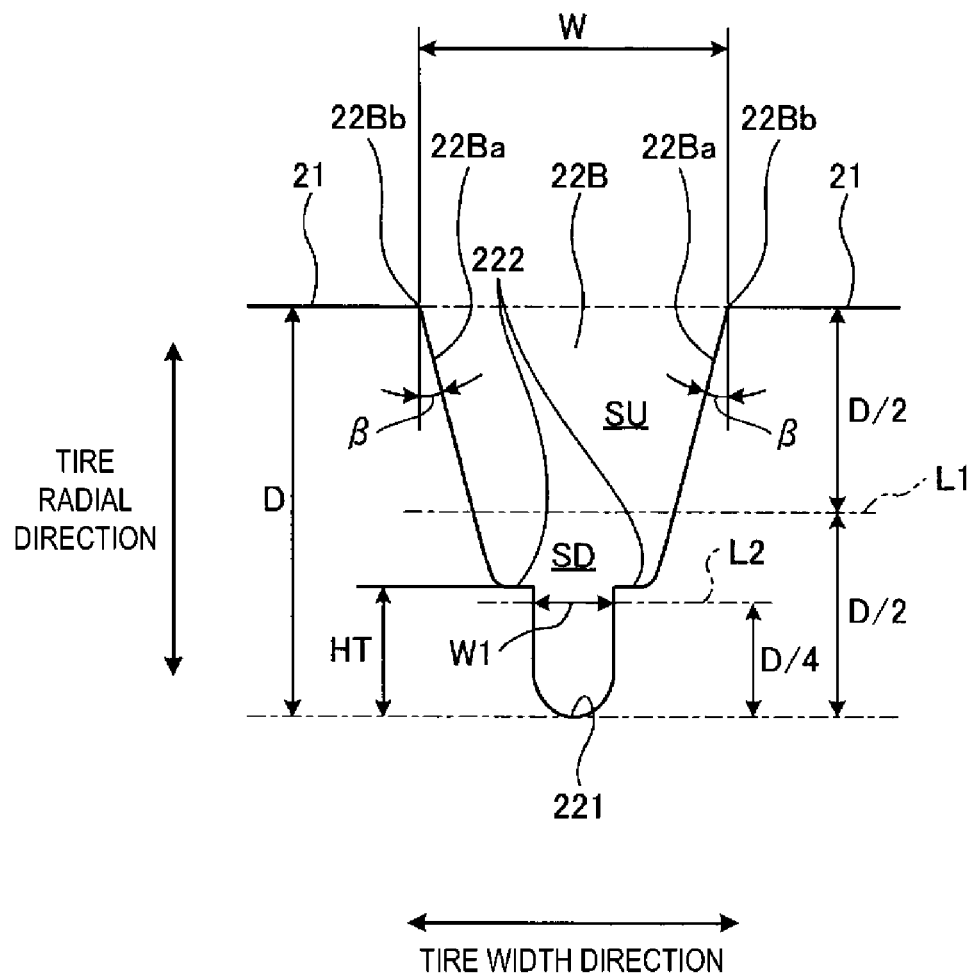
FIG. 6 is a cross-sectional view along line C-C in FIG. 5.

FIG. 6 is a diagram illustrating the structure of the circumferential main groove 22B. FIG. 6 is a cross-sectional view along line C-C in FIG. 5. As illustrated in FIG. 6, the circumferential main groove 22B includes the step portion 222 in the groove wall 22Ba between a tread surface 21 and a groove bottom 221. The step portion 222 extends in the tire circumferential direction. The step portion 222 is provided on at least one of the groove walls 22Ba. The step portion 222 forms an inflection portion in which the groove wall angle β of the groove wall 22Ba changes from the groove opening edge 22Bb of the circumferential main groove 22B toward the groove bottom. The groove wall angle β with respect to the normal line of the tread surface 21 satisfies the range of not less than 10° and not greater than 45° at the groove wall 22Ba from the tread surface 21 that is the groove opening edge 22Bb of the circumferential main groove 22B toward the groove bottom 221 to the step portion 222. In the present example, the groove wall angle β is 15°, for example.

(Notch Portion and Shallow Groove Portion Connected to Inner Circumferential Main Groove)

Figure 7:
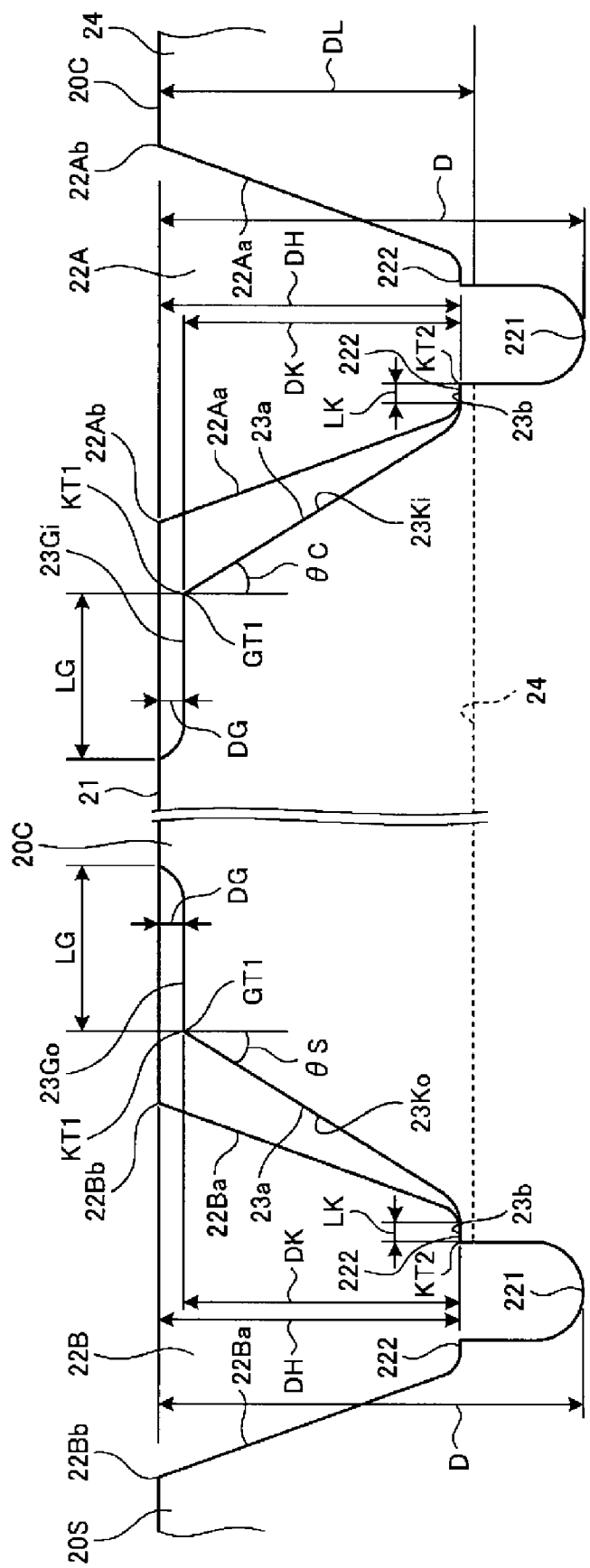
FIG. 7 is a cross-sectional view along line B-B in FIGS. 2, 3 and 5.

FIG. 7 is a cross-sectional view along line B-B in FIGS. 2, 3 and 5.

As illustrated in FIGS. 2 and 3, the notch portion 23Ki is an edge portion on both sides in the tire width direction of the circumferential main groove 22A and is provided in the land portion 20C. The notch portion 23Ki extends in the tire width direction and is connected to the circumferential main groove 22A. The notch portion 23Ki terminates in the land portion 20C, which is a first land portion. The shallow groove portion 23Gi is connected to the notch portion 23Ki and terminates in the land portion 20C, which is the first land portion.

Due to the shallow groove portion 23Gi extending from and connected to the notch portion 23Ki, the edge component increases and drainage properties are improved. Additionally, by disposing the shallow groove portion 23Gi instead of sipes, block rigidity can be maintained and uneven wear resistance performance and drainage performance can be achieved in a compatible manner. Note that the shallow groove portion 23Gi is a groove having a groove depth of 1 mm and a groove width of 0.5 mm or greater and 3.5 mm or smaller, for example.

The height in the tire radial direction of the notch portion 23Ki decreases continuously toward the groove bottom 221 of the circumferential main groove 22A to which the notch portion 23Ki is connected. More specifically, the notch portion 23Ki includes an inclined portion 23a where the height of the notch portion 23Ki changes continuously from an end portion KT1 to which the shallow groove portion 23Gi is connected toward an end portion KT2 on the inner side in the tire radial direction, rather than changing in a step shape. The notch portion 23Ki is. A planar bottom portion 23b is formed at a position near the end portion KT2. The notch portion 23Ki matches the groove wall 22Aa of the circumferential main groove 22A in the planar portion of the bottom portion 23b, and matches the step portion 222 of the circumferential main groove 22A.

The position of the end portion KT1 on the outer side in the tire radial direction of the notch portion 23Ki matches the position of the end portion GT1 of the groove bottom close to the notch portion 23Ki of the shallow groove portion 23Gi. The position of the end portion GT1 close to the notch portion 23Ki of the shallow groove portion 23Gi is a position at a height corresponding to 5% wear of the tire in the tire radial direction. The position of the end portion KT2 on the inner side in the tire radial direction of the notch portion 23Ki matches the position of the end portion of the step portion 222 of the circumferential main groove 22A on the side closer to the groove bottom 221. The position of the end portion of the step portion 222 of the circumferential main groove 22A on the side closer to the groove bottom 221 is a position at a height corresponding to the 70% wear of the tire in the tire radial direction. Thus, although the height of the notch portion 23Ki does not change until the wear of the tire reaches 5%, the height decreases continuously as the wear of the tire changes from 5% or smaller until the wear of the tire reaches 70%. In other words, the height of the notch portion 23Ki decreases continuously from a height corresponding to 5% wear of the tire to a height corresponding to 70% wear of the tire.

The ratio DK/D of the maximum height DK of the notch portion 23Ki to the groove depth D of the circumferential main groove 22A to which the notch portion 23Ki is connected is preferably 0.60 or greater and 0.85 or smaller. If the ratio DK/D is a value within this range, uneven wear resistance performance and drainage performance are improved. In this example, the ratio DK/D is 0.71.

The inclination angle θC of the inclined portion 23a of the notch portion 23Ki with respect to the normal line of the tread surface 21 is preferably greater than 20° and 45° or smaller. If the angle is within this range, uneven wear resistance performance is improved. The inclination angle θC is more preferably 20° or greater and 40° or smaller.

The ratio DG/DK of the depth DG of the shallow groove portion 23Gi to the height DK of the notch portion 23Ki to which the shallow groove portion 23Gi is connected is preferably greater than 0 and 0.2 or smaller. If the ratio DG/DK is a value in this range, uneven wear resistance performance and drainage performance are improved. The ratio DG/DK is more preferably 0.02 or greater and 0.18 or smaller.

The ratio LK/LG of the length LK in the tire width direction of the planar portion of the bottom portion 23b of the notch portion 23Ki to the length LG in the tire width direction of the shallow groove portion 23Gi is preferably greater than 0 and 0.5 or smaller. If the ratio LK/LG is a value in this range, uneven wear resistance performance is improved. The ratio LK/LG is more preferably 0.05 or greater and 0.50 or smaller and further preferably 0.1 or greater and 0.3 or smaller.

(Notch Portion and Shallow Groove Portion Connected to Outer Circumferential Main Groove)

As illustrated in FIGS. 2 and 5, the notch portion 23Ko is an edge portion on the inner side in the tire width direction of the circumferential main groove 22B and is provided in the land portion 20C. The notch portion 23Ko extends in the tire width direction and is connected to the circumferential main groove 22B. The notch portion 23Ko terminates in the land portion 20C, which is the first land portion. The shallow groove portion 23Go is connected to the notch portion 23Ko and terminates in the land portion 20C, which is the first land portion.

Due to the shallow groove portion 23Go extending from and connected to the notch portion 23Ko, the edge component increases and drainage properties are improved. Additionally, by disposing the shallow groove portion 23Go instead of sipes, block rigidity can be maintained and uneven wear resistance performance and drainage performance can be achieved in a compatible manner. Note that the shallow groove portion 23Go is a groove having a groove depth of 1 mm and a groove width of 0.5 mm or greater and 3.5 mm or smaller, for example.

The height in the tire radial direction of the notch portion 23Ko decreases continuously toward the groove bottom 221 of the circumferential main groove 22B to which the notch portion 23Ko is connected. More specifically, the notch portion 23Ko includes the inclined portion 23a where the height of the notch portion 23Ko changes continuously from the end portion KT1 to which the shallow groove portion 23Go is connected toward the end portion KT2 on the inner side in the tire radial direction, rather than changing in a step shape. The notch portion 23Ko is. A planar bottom portion 23b is formed at a position near the end portion KT2. The notch portion 23Ko matches the groove wall 22Ba of the circumferential main groove 22B in the planar portion of the bottom portion 23b, and matches the step portion 222 of the circumferential main groove 22B.

The position of the end portion KT1 on the outer side in the tire radial direction of the notch portion 23Ko matches the position of the end portion GT1 of the groove bottom close to the notch portion 23Ko of the shallow groove portion 23Go. The position of the end portion GT1 of the shallow groove portion 23Go close to the notch portion 23Ko is a position at a height corresponding to 5% wear of the tire in the tire radial direction. The position of the end portion KT2 on the inner side in the tire radial direction of the notch portion 23Ko matches the position of the end portion of the step portion 222 of the circumferential main groove 22B on the side closer to the groove bottom 221. The position of the end portion of the step portion 222 of the circumferential main groove 22B on the side closer to the groove bottom 221 is a position at a height corresponding to 70% wear of the tire in the tire radial direction. Thus, although the height of the notch portion 23Ko does not change until the wear of the tire reaches 5%, the height decreases continuously as the wear of the tire changes from 5% or smaller until the wear of the tire reaches 70%. In other words, the height of the notch portion 23Ko decreases continuously from a height corresponding to 5% wear of the tire to a height corresponding to 70% wear of the tire.

The ratio DK/D of the maximum height DK of the notch portion 23Ko to the groove depth D of the circumferential main groove 22B to which the notch portion 23Ko is connected is preferably 0.60 or greater and 0.85 or smaller. If the ratio DK/D is a value within this range, uneven wear resistance performance and drainage performance are improved. In this example, the ratio DK/D is 0.71.

The inclination angle θS of the inclined portion 23a of the notch portion 23Ko with respect to the normal line of the tread surface 21 is preferably greater than 20° and 45° or smaller. If the inclination angle is within this range, uneven wear resistance performance is improved. The inclination angle θS is more preferably 20° or greater and 40° or smaller. The inclination angle θS formed by the notch portion 23Ko is greater than the inclination angle θC formed by the notch portion 23Ki.

The ratio DG/DK of the depth DG of the shallow groove portion 23Go to the height DK of the notch portion 23Ko to which the shallow groove portion 23Go is connected is preferably greater than 0 and 0.2 or smaller. If the ratio DG/DK is a value in this range, uneven wear resistance performance and drainage performance are improved. The ratio DG/DK is more preferably 0.02 or greater and 0.18 or smaller.

The ratio LK/LG of the length LK in the tire width direction of the planar portion of the bottom portion 23b of the notch portion 23Ko to the length LG in the tire width direction of the shallow groove portion 23Go is preferably greater than 0 and 0.5 or smaller. If the ratio LK/LG is a value in this range, uneven wear resistance performance is improved. The ratio LK/LG is more preferably 0.05 or greater and 0.50 or smaller and furthermore preferably 0.1 or greater and 0.3 or smaller (Width of Land Portion and Lengths of Notch Portion and Shallow Groove Portion)

Figure 8:
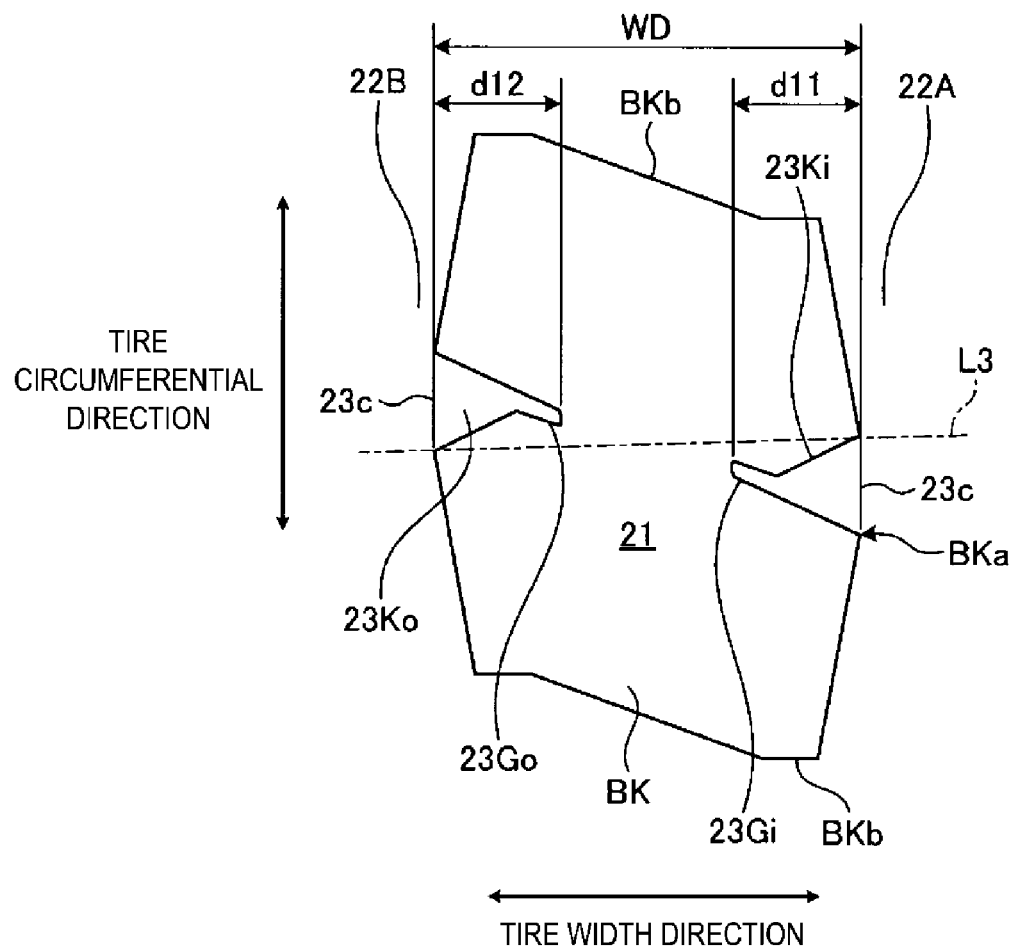
FIG. 8 is an enlarged view of the block in FIG. 2.

FIG. 8 is an enlarged view of the block BK in FIG. 2. In FIG. 8, the distance in the tire width direction between the end portion of the inner notch portion 23Ki close to the inner circumferential main groove 22A and the end portion of the outer notch portion 23Ko close to the outer circumferential main groove 22B is defined as the distance WD. The distance WD matches the width in the tire width direction of the land portion 20C which is the first land portion.

The distance in the tire width direction from the end portion of the inner notch portion 23Ki close to the inner circumferential main groove 22A to the terminating end portion of the inner shallow groove portion 23Gi connected to the inner notch portion 23Ki is defined as the distance d11. The distance d11 is the length in the tire width direction of the inner notch portion 23Ki and the inner shallow groove portion 23Gi. In this case, the ratio d11/WD of the distance d11 to the distance WD is preferably 0.1 or greater and 0.3 or smaller. If the ratio d11/WD is 0.1 or greater and 0.3 or smaller, uneven wear resistance performance is improved. The ratio d11/WD is more preferably 0.2.

Additionally, the distance in the tire width direction from the end portion of the outer notch portion 23Ko close to the outer circumferential main groove 22B to the terminating end portion of the outer shallow groove portion 23Go connected to the outer notch portion 23Ko to the distance WD is defined as the distance d12. The distance d12 is the length in the tire width direction of the outer notch portion 23Ko and the outer shallow groove portion 23Go. In this case, the ratio d12/WD of the distance d12 to the distance WD is preferably 0.1 or greater and 0.4 or smaller. If the ratio d12/WD is 0.1 or greater and 0.4 or smaller, uneven wear resistance performance is improved. The ratio d12/WD is more preferably 0.3.

Ground Contact Area of Block and Projected Area of Notch Portion

Figure 9:
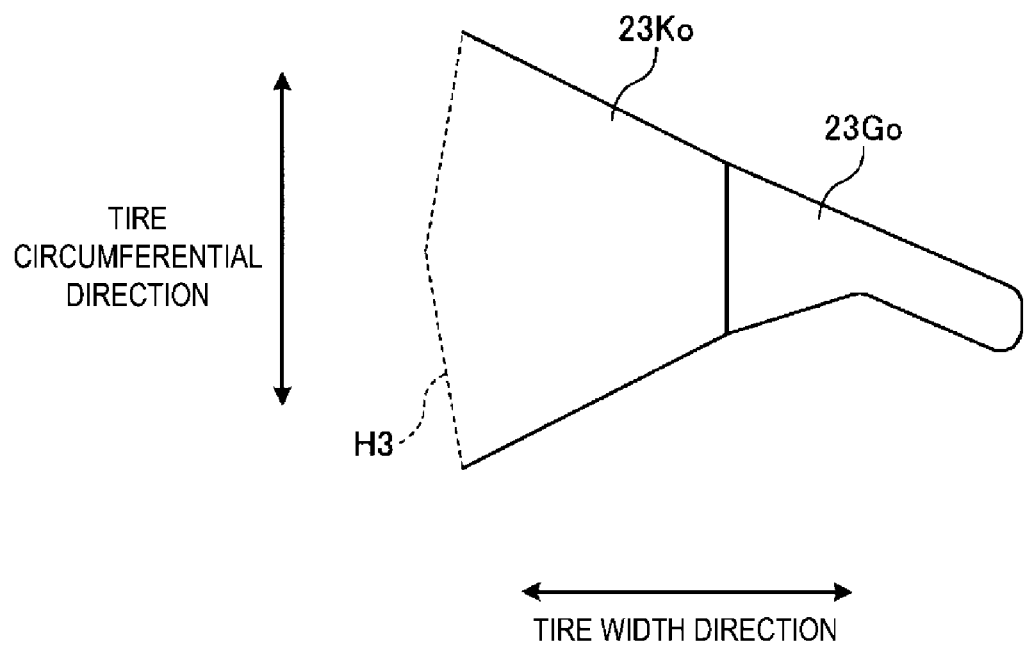
FIG. 9 is an enlarged view of an outer notch portion and an outer shallow groove portion in FIG. 8.

FIG. 9 is an enlarged view illustrating the outer notch portion 23Ko and the outer shallow groove portion 23Go in FIG. 8. In FIG. 9, a dashed line H3 is an imaginary line of the circumferential main groove 22B when the circumferential main groove 22B is viewed in a plan view. In FIG. 9, the projected area of the outer notch portion 23Ko is defined as S2. Additionally, the projected area of the outer shallow groove portion 23Go connected to the outer notch portion 23Ko is defined as S1. The projected area is an area of the tread surface 21 projected from the outer side in the tire radial direction toward the inner side in the tire radial direction.

In this case, the ratio S1/S2 of the projected area S1 to the projected area S2 is preferably $0.1 \leq S1/S2 \leq 0.5$. More preferably, $0.15 \leq S1/S2 \leq 0.3$. If the ratio S1/S2 is smaller than 0.1, the drainage properties will decrease, which is not preferable. If the ratio S1/S2 is greater than 0.5, the ground contact area will decrease and the uneven wear resistance performance will decrease, which is not preferable.

Additionally, the ratio S2/S of the projected area S2 of the outer notch portion 23Ko illustrated in FIG. 9 to the ground contact area S of the block BK illustrated in FIG. 8 is preferably $0 < S2/S \leq 0.1$. More preferably, $0.005 \leq S2/S \leq 0.100$. If the ratio S2/S is greater than 0.100, the ground contact area of block BK will decrease and uneven wear resistance performance will decrease, which is not preferable.

The "ground contact area S" is the area of a region in the tire width direction and the tire circumferential direction with which the tread surface 21 of the block BK comes into contact when the pneumatic tire 1 is mounted on a regular rim, inflated to a regular internal pressure, and loaded with 70% of a regular load.

Figure 10:
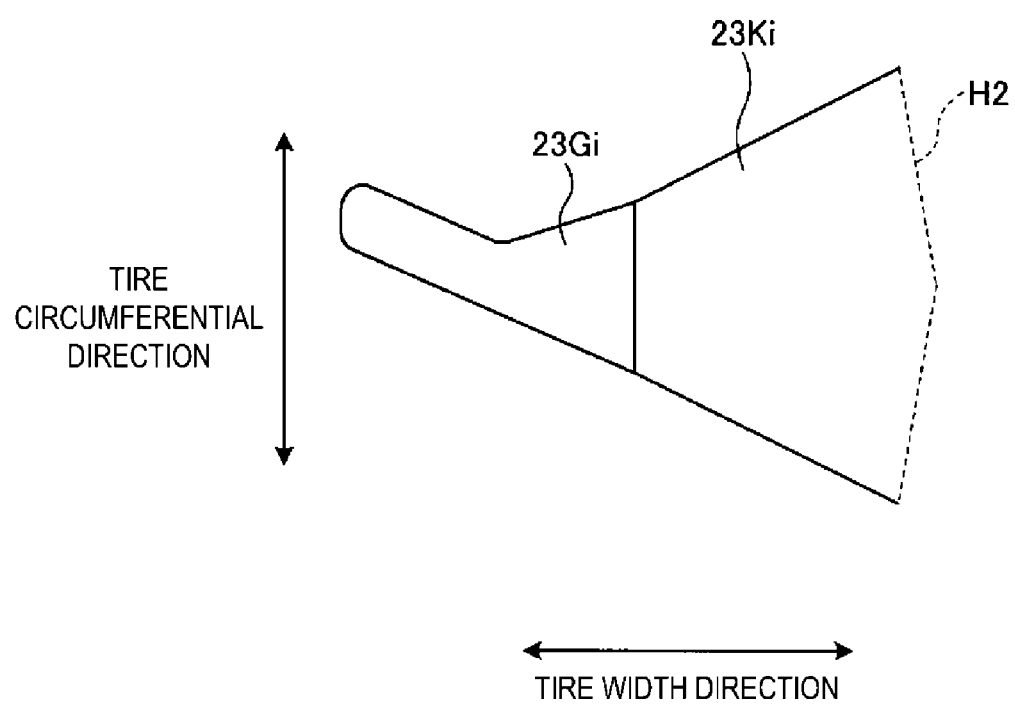
FIG. 10 is an enlarged view of an inner notch portion and an inner shallow groove portion in FIG. 8.

FIG. 10 is an enlarged view illustrating the inner notch portion 23Ki and the inner shallow groove portion 23Gi in FIG. 8. In FIG. 10, a dashed line H2 is an imaginary line of the circumferential main groove 22A when the circumferential main groove 22A is viewed in a plan view. In FIG. 10, the projected area of the inner notch portion 23Ki is defined as S4. The projected area of the inner shallow groove portion 23Gi connected to the inner notch portion 23Ki is defined as S3. In this case, the ratio S3/S4 of the projected area S3 to the projected area S4 is preferably $0.5 \leq S3/S4 \leq 0.9$. More preferably, $0.65 \leq S3/S4 \leq 0.80$. When the ratio S3/S4 is smaller than 0.5, drainage properties will decrease, which is not preferable. If the ratio S3/S4 is greater than 0.9, the ground contact area will decrease and uneven wear resistance performance will decrease, which is not preferable.

Additionally, the ratio S4/S of the projected area S4 of the inner notch portion 23Ki illustrated in FIG. 10 to the ground contact area S of the block BK illustrated in FIG. 8 is preferably from $0 < S4/S \leq 0.1$. More preferably, $0.005 \leq S4/S \leq 0.100$. If the ratio of the projected area of the inner notch portion 23Ki with respect to the ground contact area S of the block BK is greater than 0.100, the ground contact area of the block BK will decrease and uneven wear resistance performance will decrease, which is not preferable.

(Misalignment Amount of Arrangement Relative to Pitch Length of Arrangement)

Returning to FIG. 2, a plurality of inner notch portions 23Ki and a plurality of inner shallow groove portions 23Gi are arranged in the tire circumferential direction. Additionally, a plurality of outer notch portions 23Ko and a plurality of outer shallow groove portions 23Go are arranged in the tire circumferential direction.

The ratio of the misalignment amount PK of the arrangement of the inner notch portions 23Ki to the pitch length PB1 of the arrangement of the outer notch portions 23Ko is preferably 0.1 or greater and 0.5 or smaller. Additionally, the ratio of misalignment amount PG of the arrangement of the inner shallow groove portions 23Gi to the pitch length PB2 of the arrangement of the outer shallow groove portions 23Go is preferably 0.1 or greater and 0.5 or smaller. By optimizing the arrangement of the inner notch portions 23Ki and the outer notch portions 23Ko and optimizing the arrangement of the inner shallow groove portions 23Gi and the outer shallow groove portions 23Go, uneven wear resistance performance is improved.

(Configuration of Adjacent Land Portions)

Additionally, in FIG. 2, when focusing on the land portion 20C, which is a first land portion (20-1), the tread portion 2 includes the land portion 20S that is a second land portion (20-2) provided on the outer side in the tire width direction of the outer circumferential main groove 22B and the notch portion 25 that is a second notch portion that is provided in the land portion 20S which is the second land portion (20-2) and terminates in the land portion 20S. By providing the notch portion 25 on the outer side in the tire width direction of the outer circumferential main groove 22B, the edge component increases and drainage properties are improved.

Additionally, when focusing on the land portion 20C which is the first land portion (20-1), the tread portion 2 includes the land portion 20C which is a third land portion (20-3) provided with the inner circumferential main groove 22A disposed therebetween, the notch portion 23Ki which is a third notch portion provided in the land portion 20C and extending in the tire width direction and connected to the inner circumferential main groove 22A, and the shallow groove portion 23G1 connected to the notch portion 23Ki and terminating in the land portion 20C which is the third land portion (20-3). By providing the notch portion 23Ki and the shallow groove portion 23Gi in each of the land portions 20C provided on both sides across the inner circumferential main groove 22A, the edge component increases and drainage properties are improved.

Configuration of Characteristics of the Present Example

FIGS. 11A-11G are meridian cross-sectional views illustrating other examples of the circumferential main groove.

As illustrated in FIGS. 4 and 6, for the circumferential main grooves 22A and 22B, the circumferential main grooves 22A and 22B are segmented into an outer side in the tire radial direction and an inner side in the tire radial direction by drawing an imaginary segment line L1 parallel with a straight line connecting each of the groove opening edges 22Ab and 22Bb at a position of ½ (D/2) of a groove depth in a meridian cross-section, and a cross-sectional area SU on the outer side in the tire radial direction and a cross-sectional area SD on the inner side in the tire radial direction satisfy the relationship $0.15 \leq SD/SU \leq 0.60$.

As illustrated in FIGS. 4 and 6, the relationship between the cross-sectional area SD on the inner side in the tire radial direction and the cross-sectional area SU on the outer side in the tire radial direction can be obtained by the groove walls 22Aa and 22Ba being inclined to approach toward the groove bottom 221 and by including the step portion 222 so that the groove width is narrowed in the middle of the groove walls 22Aa and 22Ba. Note that the relationship of the ratio SD/SU includes not only that the circumferential main grooves 22A and 22B have a zigzag shape as described above but also that the circumferential main grooves 22A and 22B extend linearly along the tire circumferential direction or serpentine in an S-shape, although not explicitly illustrated in the drawings.

In addition, according to the configuration examples illustrated in FIGS. 11A-11G, the relationship of the ratio SD/SU of the cross-sectional area SD on the inner side in the tire radial direction to the cross-sectional area SU on the outer side in the tire radial direction can be obtained. FIGS. 11A-11G illustrate the circumferential main groove 22A as a representative. Although not explicitly illustrated in the drawings, the same applies to the circumferential main groove 22B.

Figure 11:
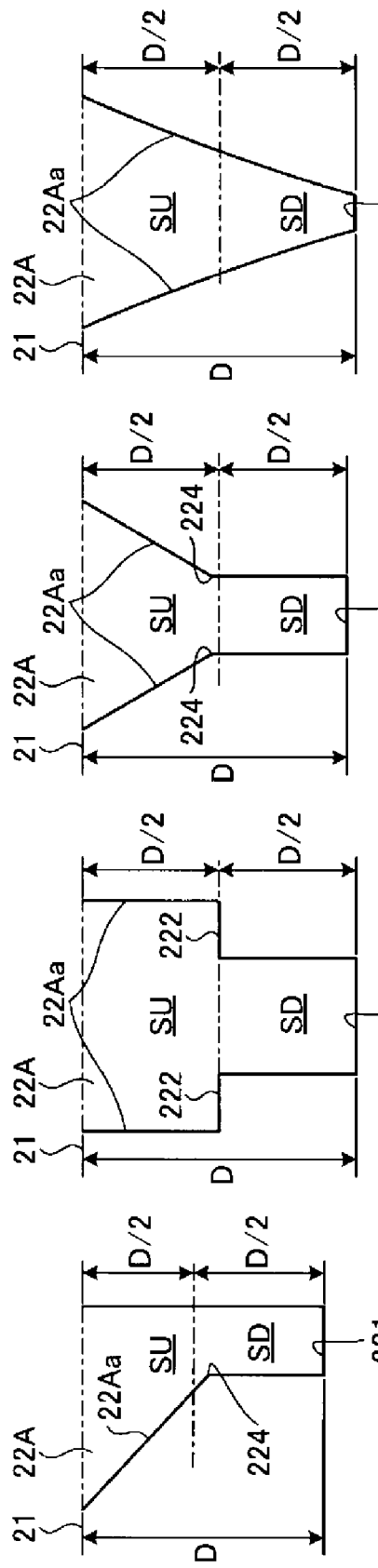
FIGS. 11A-11G are meridian cross-sectional views illustrating other examples of the circumferential main groove.

In the circumferential main groove 22A illustrated in FIG. 11A, one of the groove walls 22Aa is inclined with respect to the normal line of the tread surface 21 so as to approach the other of the groove walls 22Aa toward the groove bottom 221 and includes an inflection portion 224 where the groove wall angle of the groove wall 22Aa changes midway to be slightly raised steeply. Note that the step portion 222 is also included in the meaning of the inflection portion 224 since the groove wall angle of the groove wall 22Aa changes.

The circumferential main groove 22A illustrated in FIG. 11B is similar to the configuration illustrated in FIGS. 4 and 6, and both groove walls 22Aa are parallel with the normal line of the tread surface 21 without being inclined toward the groove bottom 221, and the step portions 222 are formed midway on the groove walls 22Aa.

In the circumferential main groove 22A illustrated in FIG. 11C, both groove walls 22Aa are inclined with respect to the normal line of the tread surface 21 so as to approach each other toward the groove bottom 221 and includes an inflection portion 224 where the groove wall angles of both groove walls 22Aa change midway to be slightly raised steeply.

In the circumferential main groove 22A illustrated in FIG. 11D, both groove walls 22Aa are inclined with respect to the normal line of the tread surface 21 so as to approach each other toward the groove bottom 221. Note that the circumferential main groove 22A illustrated in FIG. 11D is formed to be curved so as to bulge in a direction in which both groove walls 22Aa approach each other.

In the circumferential main groove 22A illustrated in FIG. 11E, both groove walls 22Aa are parallel with the normal line of the tread surface 21 without being inclined toward the groove bottom 221, and the step portions 222 are formed midway on the groove walls 22Aa. Furthermore, both groove walls 22Aa are inclined with respect to the normal line of the tread surface 21 so as to approach each other from the step portion 222 toward the groove bottom 221.

In the circumferential main groove 22A illustrated in FIG. 11F, both groove walls 22Aa are parallel with the normal line of the tread surface 21 without being inclined toward the groove bottom 221, and a plurality (here, two) of the step portions 222 are formed midway on the groove walls 22Aa.

In the circumferential main groove 22A illustrated in FIG. 11G, both groove walls 22Aa are parallel with the normal line of the tread surface 21 without being inclined toward the groove bottom 221, and the projection 225 is formed on the groove bottom 221.

In this way, by configuring the ratio SD/SU of the cross-sectional area SD on the inner side in the tire radial direction to the cross-sectional area SU on the outer side in the tire radial direction to be not less than 0.15, entrapment of stones can be prevented. On the other hand, by configuring the ratio SD/SU of the cross-sectional area SD on the inner side in the tire radial direction to the cross-sectional area SU on the outer side in the tire radial direction to be not greater than 0.60, entering of stones into the groove bottom 221 can be prevented. As a result, stone biting can be prevented. In addition, according to the relationship between the cross-sectional areas SD and SU, stone biting can be prevented without having a complicated shape. The ratio SD/SU preferably satisfies the relationship $0.20 \leq SD/SU \leq 0.50$.

In addition, as illustrated in FIGS. 4 and 6, for the circumferential main grooves 22A and 22B, when the imaginary segment line L2 is drawn at a ¼ (D/4) position from the groove bottom 221 having a groove depth D, the groove width W1 at the ¼ position and the groove width W of the groove opening portion preferably satisfy the relationship W1/W≤0.78.

It has been found by experiments of the inventors, that even if stones enter the groove opening portion, stone biting can be prevented as long as the stones do not proceed to the groove bottom 221 than the ¼ position. Additionally, it has been found by experiments of the inventors, that the width of the stone to be bitten is not less than 1.1 W and not greater than 1.4 W with respect to the groove width W of the groove opening portion. Thus, the relationship W1/W≤0.78 has been obtained according to 1.1/1.4=0.78. As a result, stone biting can be prevented without having a complicated shape. W1/W preferably satisfies the relationship W1/W≤0.75.

As described above, for the circumferential main grooves 22A and 22B, at least one of the groove walls 22Aa and 22Ba preferably includes the inflection portion 224 (step portion 222) where the groove wall angle changes from the groove opening edges 22Ab and 22Bb toward the groove bottom 221. In this way, the relationships SD/SU and W1/W described above can be satisfied.

As illustrated in FIGS. 4 and 6, for the circumferential main grooves 22A and 22B, the height HT in the tire radial direction from the groove bottom 221 to the inflection portion 224 (step portion 222) and the groove depth D preferably satisfy the relationship 0.1≤HT/D≤0.5. In a case where there are a plurality of inflection portions 224 (step portions 222), the inflection portion 224 (step portion 222) closest to the groove bottom 221 is used as a reference.

By configuring the ratio HT/D of the height HT in the tire radial direction from the groove bottom 221 to the inflection portion 224 (step portion 222) to the groove depth D to be 0.1 or greater, a projecting rubber volume in the groove on the side of the groove bottom 221 is ensured to inhibit the strike against the groove bottom 221 due to the stone to be bitten and prevent stone biting. On the other hand, by configuring the ratio HT/D to be not greater than 0.5, the relationship SD/SU and W1/W described above can be satisfied during the intermediate stages of wear. HT/D preferably satisfies the relationship 0.2≤HT/D≤0.4.

As illustrated in FIGS. 4 and 6, for the circumferential main grooves 22A and 22B, the groove wall angles α and β with respect to the normal line of the tread surface 21 from the groove opening edges 22Ab and 22Bb of the groove walls 22Aa and 22Ba toward the groove bottom 221 preferably satisfy a range of not less than 10° and not greater than 45°.

By configuring the groove wall angles α and β to be 10° or greater, discharge of the bitten stones can be improved. On the other hand, by configuring the groove wall angles α and β to be not greater than 45°, an increase in the groove width of the circumferential main grooves 22A and 22B is suppressed, and a decrease in the degree of freedom of the design due to limitation of the number of circumferential main grooves 22A and 22B in the tread pattern is suppressed. The groove wall angles α and β preferably satisfy a range of not less than 15° and not greater than 35°.

Figure 12:
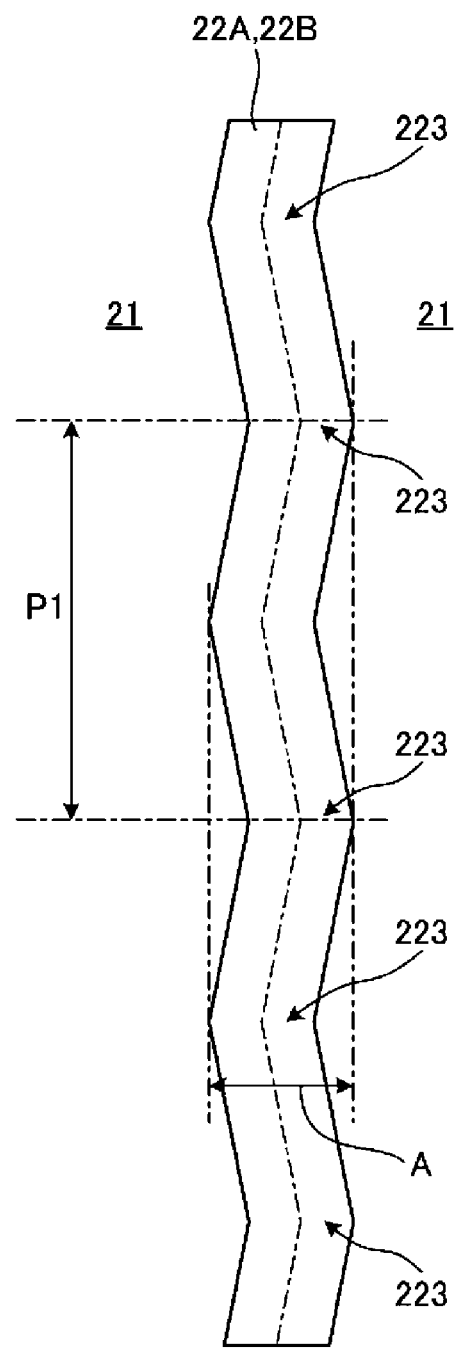
FIG. 12 is a plan view illustrating a schematic configuration of the circumferential main groove.

FIG. 12 is a plan view illustrating a schematic configuration of the circumferential main grooves.

As illustrated in FIG. 12, the circumferential main grooves 22A and 22B have a zigzag shape in which a plurality of bent portions 223 that bend in the tire width direction are disposed alternately in the tire circumferential direction. By configuring the circumferential main grooves 22A and 22B to be a zigzag shape, the edge component increases, and the wet braking performance, which is traction performance, is improved.

As illustrated in FIG. 12, the circumferential main grooves 22A and 22B have a pitch length P1 of one period of the zigzag shape and a tire circumferential length TL in the tire circumferential direction, and preferably satisfies the relationship 0.005≤P1/TL≤0.03. The tire circumferential length TL is the total length at the opening portion to the tread surface 21 of the circumferential main grooves 22A and 22B in the tire circumferential direction when the tire is mounted on a specified rim, inflated to the specified internal pressure, and in a static state without being loaded. By configuring the ratio P1/TL of the pitch length P1 of one period of the zigzag shape to the tire circumferential length TL in the tire circumferential direction to be 0.005 or greater, the edge component of the zigzag shape can be effectively obtained. On the other hand, by configuring the ratio P1/TL to be not greater than 0.03, stress concentration due to the extremely large number of zigzag-shaped bent portions 223 is suppressed, and chipping and separation of the edge portions of the circumferential main grooves 22A and 22B due to the bent portions 223 can be prevented. In the present example, P1/TL is 0.0185, for example.

As illustrated in FIG. 12, the circumferential main grooves 22A and 22B have an amplitude A of one period of the zigzag shape and a tire development width TDW, and preferably satisfy the relationship 0.01≤A/TDW≤0.05. The amplitude A of one period of the zigzag shape is the maximum amplitude in the tire width direction of the zigzag shape. As illustrated in FIG. 2, the tire development width TDW is a width in which the maximum width of the tread pattern is developed in a plane, and in this example, corresponds to the position between the outer ends in the tire width direction of each of the lug grooves 30 on the outermost side in the tire width direction. By configuring the ratio A/TDW of the amplitude A of one period of the zigzag shape to the tire development width TDW to be 0.01 or greater, the edge component of the zigzag shape can be effectively obtained. On the other hand, by configuring the ratio A/TDW to be not greater than 0.05, stress concentration due to extremely high amplitude of the zigzag shape is suppressed, and chipping and separation of the edge portions of the circumferential main grooves 22A and 22B due to the bent portions 223 can be prevented. In the example, A/TDW is, for example, 0.027.

As illustrated in FIG. 2, the circumferential main grooves 22A and 22B are provided side by side in the tire width direction. In each of the circumferential main grooves 22A and 22B adjacent to each other in the tire width direction, the positions of bent portions 223 of the zigzag shape preferably differ in the tire circumferential direction. Since the positions of the zigzag-shaped bent portions 223 differ in the tire circumferential direction, the edge component of the zigzag shape can be effectively obtained, and the rigidity of the land portion 20C defined between the circumferential main grooves 22A and 22B can be maintained, and uneven wear resistance performance can be improved.

As illustrated in FIG. 2, the circumferential main grooves 22A and 22B are provided side by side in the tire width direction, a plurality of the lug grooves 24 are provided side by side in the tire circumferential direction so as to connect mutual bent portions 223 closest in the tire width direction of the zigzag shape with respect to two circumferential main grooves 22A and 22B adjacent to each other in the tire width direction, and the block BK is preferably defined by the two circumferential main grooves 22A and 22B adjacent to each other in the tire width direction and the two lug grooves 24 adjacent to each other in the tire circumferential direction. In a case where the lug grooves 24 are provided so as to connect the mutual bent portions 223 closest in the tire width direction of the zigzag shape in the two circumferential main grooves 22A and 22B, the extending length of the lug grooves 24 can be shortened compared to the case where other portions of the two circumferential main grooves 22A and 22B are connected. As a result, the amount of stone biting generated in the lug grooves 24 can be suppressed.

As illustrated in FIG. 8, according to the zigzag shape of the circumferential main grooves 22A and 22B, the block BK preferably includes one broad width portion BKa having a broadest width in the tire width direction at the center in the tire circumferential direction and includes a narrow width portion BKb having a narrowest width in the tire width direction at both ends in the tire circumferential direction. According to this configuration, the edge component can be effectively obtained, and the block BK is formed in a substantially hexagonal shape in a plan view, and block rigidity can be ensured and uneven wear resistance performance can be improved compared to a configuration in which the center in the tire circumferential direction is narrower.

As illustrated in FIG. 2, the lug groove 24 preferably includes bent portions 24a at at least two positions. By providing the bent portions 24a in the lug groove 24, the edge component is increased, and wet braking performance, which is traction performance, is improved. In the present example, two bent portions 24a are provided in one lug groove 24. In addition, as illustrated in FIG. 2, the ratio Lb/La of the distance Lb from the end portion of the lug groove 24 to the bent portion 24a to the extension length La in the tire width direction of the lug groove 24 preferably satisfies the range of $0.10 \leq Lb/La \leq 0.20$. When the bent portion 24a is too close to the end portion of the lug groove 24, the edge effect will decrease, and when the bent portion 24a is too far from the end portion of the lug groove 24, extreme bend is generated at the center portion of the lug groove 24, so that blocking rigidity cannot be ensured, which degrades uneven wear resistance performance and causes chipping and separation. In a case where the ratio Lb/La is within the range described above, the edge effect can be effectively obtained, and uneven wear resistance performance and durability performance can be ensured.

As illustrated in FIG. 7, for the lug groove 24, the groove depth DL of the lug groove 24 and the groove depth D of the circumferential main grooves 22A and 22B to which the lug groove 24 is connected preferably satisfy the relationship $DL/D \leq 0.8$. By configuring the lug grooves 24 to be shallower than the circumferential main grooves 22A and 22B, stress imparted to the land portion 20C can be prevented from being concentrated partially, stress generated in the circumferential main grooves 22A and 22B can be reduced, and groove cracking resistance performance in the lug grooves 24 can be improved.

As illustrated in FIG. 7, for the notch portions 23Ki and 23Ko, the notch portions 23a have the inclination angle θC toward the groove bottom 221 of the circumferential main groove 22A near the tire equatorial plane CL and the inclination angle θS toward the groove bottom 221 of the circumferential main groove 22B near the tire ground contact edge T, which preferably satisfy the relationships θC≤20° and θC<θS. By providing the inclined portions 23a in the notch portions 23Ki and 23Ko, the bitten stones can be discharged or moved to the circumferential main grooves 22A and 22B, and stone biting can be prevented. The larger the inclination angles θC and θS, the less stone biting. Since ground contact pressure is large near the tire equatorial plane CL, the inclination angle θC is configured to be not less than 20° to improve the effect of stone discharge even slightly. The inclination angle θS near the tire ground contact edge T is configured to be relatively greater than the inclination angle θC, in consideration of deterioration of the groove crack resistance performance.

As illustrated in FIG. 8, for the notch portions 23Ki and 23Ko, at the block BK, the notch portions 23Ki and 23Ko are preferably disposed so that the opening portions 23c connected to the circumferential main grooves 22A and 22B are misaligned in the tire circumferential direction, and edges of the opening portions 23c on one side preferably match each other on a reference line L3 that is parallel with the tire width direction. The reference line L3 passes through a center point in the tire circumferential direction of the block BK. Thus, each of the opening portions 23c is disposed at a position symmetrical with respect to the center point in the tire circumferential direction of the block BK. In a case where the notch portions 23Ki and 23Ko are disposed in the block BK, the ground contact surface pressure of the tread surface 21 of the block BK may be uneven, and there is a concern that groove cracking due to uneven wear and stress concentration and chipping and separation of the block BK may be generated. Thus, by matching edges of the opening portions 23c on one side each other on the reference line L3 that is parallel with the tire width direction so as not to separate the opening portions 23c each other in the tire circumferential direction while displacing the opening portions 23c of the notch portions 23Ki and 23Ko provided at each of the ends in the tire width direction of the block BK in the tire circumferential direction, stress during the tire rotation is dispersed uniformly, and the above described problem is resolved.

As illustrated in FIGS. 2 and 3, the notch portion 23Ki is preferably provided to face one end of the lug groove 24 across the circumferential main groove 22A. By disposing the notch portion 23Ki, a pocket-shaped space may be created between the notch portion 23Ki and the opposing block BK interposing the circumferential main groove 22A, so that the stones may be bitten in the groove bottom 221 of the circumferential main groove 22A. However, by disposing the notch portion 23Ki on the extension line of the lug groove 24, discharge of the stones is promoted and stone biting can be prevented.

As illustrated in FIG. 7, for the notch portions 23Ki and 23Ko, the maximum height DK of the notch portions 23Ki and 23Ko in the tire radial direction and the groove depth D of the circumferential main grooves 22A and 22B to which the notch portions 23Ki and 23Ko are connected preferably satisfy the relationship $0.60 \leq DK/D \leq 0.85$. By configuring the ratio DK/D of the maximum height DK of the notch portions 23Ki and 23Ko to the groove depth D of the circumferential main grooves 22A and 22B to be 0.60 or greater, drainage performance can be improved and traction performance can be improved. On the other hand, by configuring the ratio DK/D of the maximum height DK of the notch portions 23Ki and 23Ko in the tire radial direction to the groove depth D of the circumferential main grooves 22A and 22B to be not greater than 0.85, the block rigidity of the block BK can be maintained and uneven wear resistance performance can be improved.

As illustrated in FIG. 7, for the lug groove 24, the groove depth DL of the lug groove 24 and the depth DH from the tread surface 21 of the step portion 222 of the circumferential main grooves 22A and 22B to which the lug groove 24 is connected preferably satisfy the relationship $DL/DH \leq 1.1$.

Figure 13:
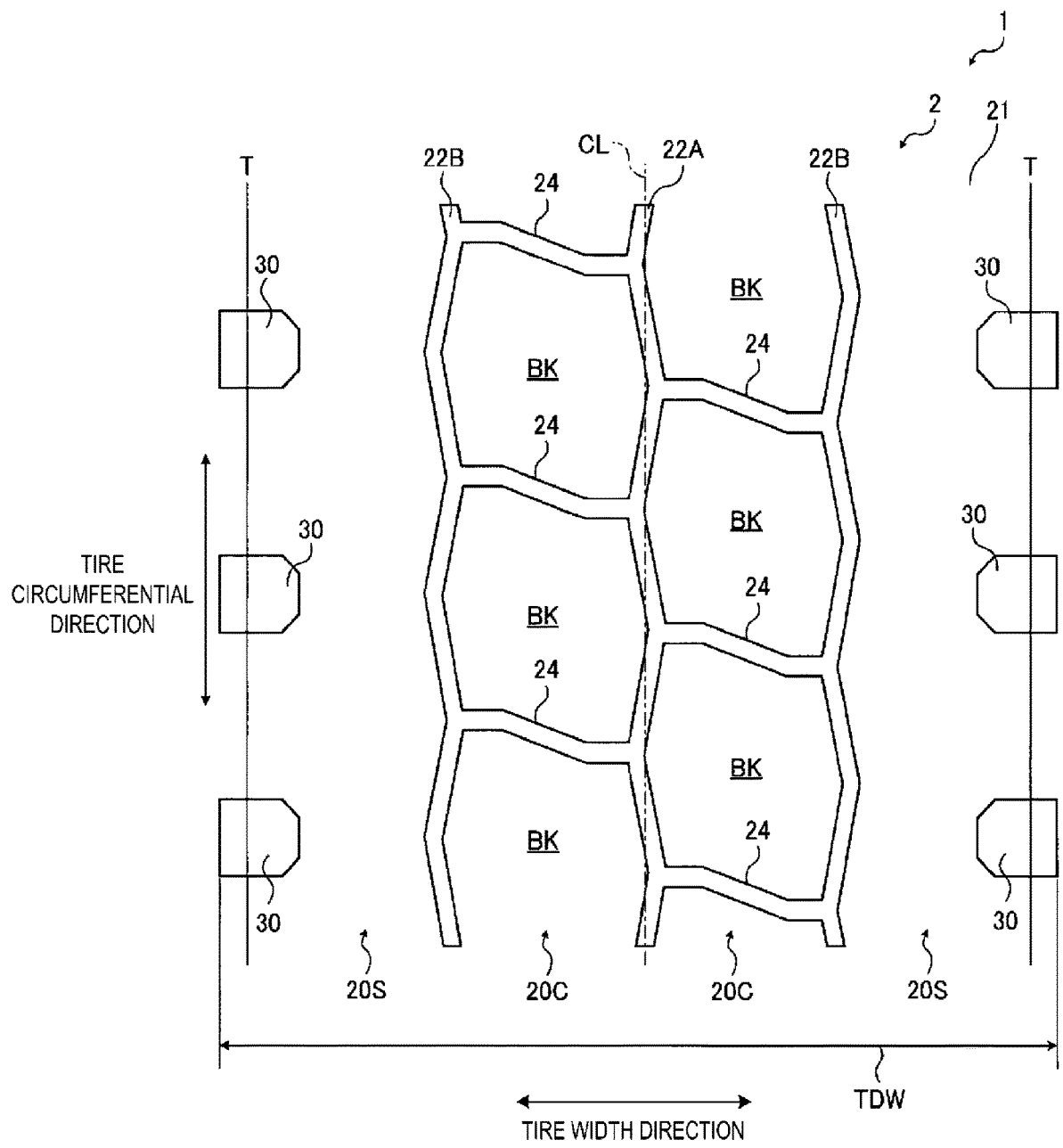
FIG. 13 is a plan view illustrating a tread surface of the pneumatic tire according to the present embodiment when worn.

FIG. 13 is a plan view illustrating a tread surface of the pneumatic tire 1 according to the present embodiment when worn. FIG. 13 illustrates a case where the circumferential main grooves 22A and 22B have worn up to the step portion 222 (e.g., 70% tire wear). As illustrated in FIG. 13, when the circumferential main grooves 22A and 22B wear up to the step portion 222, the groove widths of the circumferential main grooves 22A and 22B become extremely narrow, and thus, by configuring the groove depth DL of the lug groove 24 to be deeper than the depth DH from the tread surface 21 of the step portion 222, traction performance can be ensured until the terminal stages of wear.

As illustrated in FIG. 2, the lug groove 30 terminates in the land portion 20S and is not connected to the circumferential main groove 22B provided on the outermost side in the tire width direction. Specifically, a groove that extends continuously from the circumferential main groove 22B to the tire ground contact edge T is not disposed on the outer side in the tire width direction of the circumferential main groove 22B provided on the outermost side in the tire width direction. Thus, the rigidity of the land portion 20S on the outermost side in the tire width direction can be maintained and uneven wear resistance performance can be improved.

EXAMPLE

In the examples, performance tests for stone rejecting performance and wet braking performance were performed on a plurality of types of pneumatic tires of different conditions (see Tables 1 and 2).

In the performance tests, pneumatic tires (heavy duty pneumatic tires) having a tire size of 11R22.5 were assembled on specified rims, inflated to a specified air pressure, and mounted on a drive shaft of a test vehicle (2-D tractor head).

For the evaluation of stone rejecting performance, after running on the non-paved road for 10 hours and then after running on the paved road for two hours with the test vehicle, the number of stones remaining in the groove is measured. The number of stones remaining in the groove is expressed as an index value and evaluated with the results of Conventional Example being defined as the reference value (100). The evaluation indicates that, larger index values indicate a smaller number of stones remaining in the groove and superior stone rejecting performance.

The evaluation of wet braking performance is performed in accordance with R117-02 (ECE (Economic Commission for Europe) Regulation No. 117 Revision 2), and wet braking performance is measured with the above described vehicle. The braking distance is expressed as an index value and evaluated with the results of Conventional Example being defined as the reference value (100). In the evaluation, larger index values indicate a shorter braking distance and superior wet braking performance.

In the pneumatic tires of the Conventional Example and Comparative Example 1 in Table 1, SD/SU in the circumferential main grooves is out of the specified range. On the other hand, in the embodiments in Tables 1 and 2, SD/SU in the circumferential main grooves is in the specified range. Note that in the column of "Shape of block: broad width portion and narrow width portion", "Yes" means that one block includes one broad width portion at the center in the tire circumferential direction and includes a narrow width portion at both ends in the tire circumferential direction (see FIG. 2), and "Two broad width portions" means that one block includes two broad width portions in the tire circumferential direction and includes a narrow width portion at each of the center and both the ends in the tire circumferential direction. Additionally, in the column of "Lug groove provided with bent portion", "Yes", means that two bent portions are included (see FIG. 2). Additionally, in the column of "Position of notch portion in block", "Opening portion match" means that the opening portion of the notch portion matches in the tire circumferential direction, and "Opening portion mismatch" means that the opening portion of the notch portion is disposed misaligned in the tire circumferential direction and edges of the opening portions on one side match each other in the tire circumferential direction (see FIG. 8).

As can be understood from the test results in Tables 1 and 2, the pneumatic tires of Examples have better stone rejecting performance.

TABLE 1

|  | Conventional Example | Comparative Example 1 | Example 1 | Example 2 | Example 3 | Example 4 |
|---|---|---|---|---|---|---|
| Circumferential main groove: SD/SU | 0.7 | 0.7 | 0.15 | 0.6 | 0.4 | 0.4 |
| Circumferential main groove: W1/W | 0.8 | 0.8 | 0.8 | 0.8 | 0.8 | 0.78 |
| Inflection portion (step portion) | No | Yes | No | No | No | No |
| Circumferential main groove: HT/D | — | 0.6 | — | — | — | — |
| Groove wall angle (°) of circumferential main groove | 8 | 8 | 8 | 8 | 8 | 8 |
| Zigzag shape of circumferential main groove | No | No | No | No | No | No |
| Zigzag shape: P1/TL | — | — | — | — | — | — |
| Zigzag shape: A/TDW | — | — | — | — | — | — |
| Difference of positions in tire circumferential direction of zigzag-shaped bent portions in plurality of circumferential main grooves | — | — | — | — | — | — |
| Lug groove connecting zigzag-shaped bent portions | — | — | — | — | — | — |
| Shape of block: broad width portion and narrow width portion | — | — | — | — | — | — |
| Lug groove provided with bent portion | — | — | — | — | — | — |
| Lug groove: DL/D | — | — | — | — | — | — |
| θC (°) | 15 | 15 | 15 | 15 | 15 | 15 |

TABLE 1-continued

|  |  |  |  |  |  |  |
|---|---|---|---|---|---|---|
| θC < θS | Same | Same | Same | Same | Same | Same |
| Position of notch portion in block | Opening match | Opening match | Opening match | Opening match | Opening match | Opening match |
| Notch portion faces one end of lug groove | No | No | No | No | No | No |
| Notch portion: DK/D | 0.50 | 0.50 | 0.50 | 0.50 | 0.50 | 0.50 |
| Communication groove on outermost side in tire width direction | No | No | No | No | No | No |
| Lug groove: DL/DH | 1.2 | 1.2 | 1.2 | 1.2 | 1.2 | 1.2 |
| Stone rejecting performance | 100 | 110 | 118 | 112 | 115 | 117 |
| Wet braking performance | 100 | 100 | 100 | 100 | 100 | 100 |

|  | Example 5 | Example 6 | Example 7 | Example 8 | Example 9 | Example 10 |
|---|---|---|---|---|---|---|
| Circumferential main groove: SD/SU | 0.4 | 0.4 | 0.4 | 0.4 | 0.4 | 0.4 |
| Circumferential main groove: W1/W | 0.75 | 0.75 | 0.75 | 0.75 | 0.75 | 0.75 |
| Inflection portion (step portion) | No | Yes | Yes | Yes | Yes | Yes |
| Circumferential main groove: HT/D | — | 0.6 | 0.1 | 0.5 | 0.2 | 0.4 |
| Groove wall angle (°) of circumferential main groove | 8 | 8 | 8 | 8 | 8 | 8 |
| Zigzag shape of circumferential main groove | No | No | No | No | No | No |
| Zigzag shape: P1/TL | — | — | — | — | — | — |
| Zigzag shape: A/TDW | — | — | — | — | — | — |
| Difference of positions in tire circumferential direction of zigzag-shaped bent portions in plurality of circumferential main grooves | — | — | — | — | — | — |
| Lug groove connecting zigzag-shaped bent portions | — | — | — | — | — | — |
| Shape of block: broad width portion and narrow width portion | — | — | — | — | — | — |
| Lug groove provided with bent portion | — | — | — | — | — | — |
| Lug groove: DL/D | — | — | — | — | — | — |
| θC (°) | 15 | 15 | 15 | 15 | 15 | 15 |
| θC < θS | Same | Same | Same | Same | Same | Same |
| Position of notch portion in block | Opening match | Opening match | Opening match | Opening match | Opening match | Opening match |
| Notch portion faces one end of lug groove | No | No | No | No | No | No |
| Notch portion: DK/D | 0.50 | 0.50 | 0.50 | 0.50 | 0.50 | 0.50 |
| Communication groove on outermost side in tire width direction | No | No | No | No | No | No |
| Lug groove: DL/DH | 1.2 | 1.2 | 1.2 | 1.2 | 1.2 | 1.2 |
| Stone rejecting performance | 119 | 121 | 121 | 123 | 122 | 123 |
| Wet braking performance | 100 | 101 | 105 | 102 | 104 | 103 |

|  | Example 11 | Example 12 | Example 13 | Example 14 | Example 15 | Example 16 |
|---|---|---|---|---|---|---|
| Circumferential main groove: SD/SU | 0.4 | 0.4 | 0.4 | 0.4 | 0.4 | 0.4 |
| Circumferential main groove: W1/W | 0.75 | 0.75 | 0.75 | 0.75 | 0.75 | 0.75 |
| Inflection portion (step portion) | Yes | Yes | Yes | Yes | Yes | Yes |
| Circumferential main groove: HT/D | 0.3 | 0.3 | 0.3 | 0.3 | 0.3 | 0.3 |
| Groove wall angle (°) of circumferential main groove | 8 | 10 | 45 | 15 | 35 | 25 |
| Zigzag shape of circumferential main groove | No | No | No | No | No | No |
| Zigzag shape: P1/TL | — | — | — | — | — | — |
| Zigzag shape: A/TDW | — | — | — | — | — | — |
| Difference of positions in tire circumferential direction of zigzag-shaped bent portions in plurality of circumferential main grooves | — | — | — | — | — | — |
| Lug groove connecting zigzag-shaped bent portions | — | — | — | — | — | — |
| Shape of block: broad width portion and narrow width portion | — | — | — | — | — | — |
| Lug groove provided with bent portion | — | — | — | — | — | — |
| Lug groove: DL/D | — | — | — | — | — | — |
| θC (°) | 15 | 15 | 15 | 15 | 15 | 15 |
| θC < θS | Same | Same | Same | Same | Same | Same |
| Position of notch portion in block | Opening match | Opening match | Opening match | Opening match | Opening match | Opening match |
| Notch portion faces one end of lug groove | No | No | No | No | No | No |
| Notch portion: DK/D | 0.50 | 0.50 | 0.50 | 0.50 | 0.50 | 0.50 |
| Communication groove on outermost side in tire width direction | No | No | No | No | No | No |

TABLE 1-continued

| | | | | | | |
|---|---|---|---|---|---|---|
| Lug groove: DL/DH | 1.2 | 1.2 | 1.2 | 1.2 | 1.2 | 1.2 |
| Stone rejecting performance | 123 | 124 | 128 | 125 | 127 | 126 |
| Wet braking performance | 104 | 106 | 103 | 106 | 104 | 105 |

TABLE 2

| | Example 17 | Example 18 | Example 19 | Example 20 | Example 21 | Example 22 |
|---|---|---|---|---|---|---|
| Circumferential main groove: SD/SU | 0.4 | 0.4 | 0.4 | 0.4 | 0.4 | 0.4 |
| Circumferential main groove: W1/W | 0.75 | 0.75 | 0.75 | 0.75 | 0.75 | 0.75 |
| Inflection portion (step portion) | Yes | Yes | Yes | Yes | Yes | Yes |
| Circumferential main groove: HT/D | 0.3 | 0.3 | 0.3 | 0.3 | 0.3 | 0.3 |
| Groove wall angle (°) of circumferential main groove | 25 | 25 | 25 | 25 | 25 | 25 |
| Zigzag shape of circumferential main groove | Yes | Yes | Yes | Yes | Yes | Yes |
| Zigzag shape: P1/TL | 0.003 | 0.005 | 0.030 | 0.0185 | 0.0185 | 0.0185 |
| Zigzag shape: A/TDW | 0.01 | 0.01 | 0.01 | 0.01 | 0.005 | 0.05 |
| Difference of positions in tire circumferential direction of zigzag-shaped bent portions in plurality of circumferential main grooves | No | No | No | No | No | No |
| Lug groove connecting zigzag-shaped bent portions | No | No | No | No | No | No |
| Shape of block: broad width portion and narrow width portion | — | — | — | — | — | — |
| Lug groove provided with bent portion | — | — | — | — | — | — |
| Lug groove: DL/D | — | — | — | — | — | — |
| θC (°) | 15 | 15 | 15 | 15 | 15 | 15 |
| θC < θS | Same | Same | Same | Same | Same | Same |
| Position of notch portion in block | Opening match | Opening match | Opening match | Opening match | Opening match | Opening match |
| Notch portion faces one end of lug groove | No | No | No | No | No | No |
| Notch portion: DK/D | 0.50 | 0.50 | 0.50 | 0.50 | 0.50 | 0.50 |
| Communication groove on outermost side in tire width direction | No | No | No | No | No | No |
| Lug groove: DL/DH | 1.2 | 1.2 | 1.2 | 1.2 | 1.2 | 1.2 |
| Stone rejecting performance | 126 | 127 | 128 | 129 | 129 | 130 |
| Wet braking performance | 107 | 107 | 106 | 106 | 107 | 106 |

| | Example 23 | Example 24 | Example 25 | Example 26 | Example 27 | Example 28 | Example 29 |
|---|---|---|---|---|---|---|---|
| Circumferential main groove: SD/SU | 0.4 | 0.4 | 0.4 | 0.4 | 0.4 | 0.4 | 0.4 |
| Circumferential main groove: W1/W | 0.75 | 0.75 | 0.75 | 0.75 | 0.75 | 0.75 | 0.75 |
| Inflection portion (step portion) | Yes | Yes | Yes | Yes | Yes | Yes | Yes |
| Circumferential main groove: HT/D | 0.3 | 0.3 | 0.3 | 0.3 | 0.3 | 0.3 | 0.3 |
| Groove wall angle (°) of circumferential main groove | 25 | 25 | 25 | 25 | 25 | 25 | 25 |
| Zigzag shape of circumferential main groove | Yes | Yes | Yes | Yes | Yes | Yes | Yes |
| Zigzag shape: P1/TL | 0.0185 | 0.0185 | 0.0185 | 0.0185 | 0.0185 | 0.0185 | 0.0185 |
| Zigzag shape: A/TDW | 0.027 | 0.027 | 0.027 | 0.027 | 0.027 | 0.027 | 0.027 |
| Difference of positions in tire circumferential direction of zigzag-shaped bent portions in plurality of circumferential main grooves | No | Yes | Yes | Yes | Yes | Yes | Yes |
| Lug groove connecting zigzag-shaped bent portions | No | No | Yes | Yes | Yes | Yes | Yes |
| Shape of block: broad width portion and narrow width portion | — | — | Two broad width portions | Yes | Yes | Yes | Yes |
| Lug groove provided with bent portion | — | — | No | No | Yes | Yes | Yes |
| Lug groove: DL/D | — | — | 0.90 | 0.90 | 0.90 | 0.80 | 0.80 |
| θC (°) | 15 | 15 | 15 | 15 | 15 | 15 | 20 |
| θC < θS | Same | Same | Same | Same | Same | Same | Same |
| Position of notch portion in block | Opening match | Opening match | Opening match | Opening match | Opening match | Opening match | Opening match |
| Notch portion faces one end of lug groove | No | No | No | No | No | No | No |
| Notch portion: DK/D | 0.50 | 0.50 | 0.50 | 0.50 | 0.50 | 0.50 | 0.50 |
| Communication groove on outermost side in tire width direction | No | No | No | No | No | No | No |
| Lug groove: DL/DH | 1.2 | 1.2 | 1.2 | 1.2 | 1.2 | 1.2 | 1.2 |
| Stone rejecting performance | 129 | 129 | 130 | 131 | 131 | 132 | 134 |
| Wet braking performance | 107 | 108 | 110 | 112 | 114 | 114 | 114 |

TABLE 2-continued

| | Example 30 | Example 31 | Example 32 | Example 33 | Example 34 | Example 35 | Example 36 |
|---|---|---|---|---|---|---|---|
| Circumferential main groove: SD/SU | 0.4 | 0.4 | 0.4 | 0.4 | 0.4 | 0.4 | 0.4 |
| Circumferential main groove: W1/W | 0.75 | 0.75 | 0.75 | 0.75 | 0.75 | 0.75 | 0.75 |
| Inflection portion (step portion) | Yes | Yes | Yes | Yes | Yes | Yes | Yes |
| Circumferential main groove: HT/D | 0.3 | 0.3 | 0.3 | 0.3 | 0.3 | 0.3 | 0.3 |
| Groove wall angle (°) of circumferential main groove | 25 | 25 | 25 | 25 | 25 | 25 | 25 |
| Zigzag shape of circumferential main groove | Yes | Yes | Yes | Yes | Yes | Yes | Yes |
| Zigzag shape: P1/TL | 0.0185 | 0.0185 | 0.0185 | 0.0185 | 0.0185 | 0.0185 | 0.0185 |
| Zigzag shape: A/TDW | 0.027 | 0.027 | 0.027 | 0.027 | 0.027 | 0.027 | 0.027 |
| Difference of positions in tire circumferential direction of zigzag-shaped bent portions in plurality of circumferential main grooves | Yes | Yes | Yes | Yes | Yes | Yes | Yes |
| Lug groove connecting zigzag-shaped bent portions | Yes | Yes | Yes | Yes | Yes | Yes | Yes |
| Shape of block: broad width portion and narrow width portion | Yes | Yes | Yes | Yes | Yes | Yes | Yes |
| Lug groove provided with bent portion | Yes | Yes | Yes | Yes | Yes | Yes | Yes |
| Lug groove: DL/D | 0.80 | 0.80 | 0.80 | 0.80 | 0.80 | 0.80 | 0.80 |
| θC (°) | 20 | 20 | 20 | 20 | 20 | 20 | 20 |
| θC < θS | <θS | <θS | <θS | <θS | <θS | <θS | <θS |
| Position of notch portion in block | Opening match | Opening mismatch | Opening mismatch | Opening mismatch | Opening mismatch | Opening mismatch | Opening mismatch |
| Notch portion faces one end of lug groove | No | No | Yes | Yes | Yes | Yes | Yes |
| Notch portion: DK/D | 0.50 | 0.50 | 0.50 | 0.60 | 0.85 | 0.85 | 0.85 |
| Communication groove on outermost side in tire width direction | No | No | No | No | No | Yes | No |
| Lug groove: DL/DH | 1.2 | 1.2 | 1.2 | 1.2 | 1.2 | 1.2 | 1.1 |
| Stone rejecting performance | 134 | 135 | 137 | 136 | 136 | 136 | 136 |
| Wet braking performance | 115 | 115 | 116 | 117 | 118 | 120 | 121 |

The invention claimed is:

1. A pneumatic tire, comprising:

a circumferential main groove extending in a tire circumferential direction in a tread surface of a tread portion;

the circumferential main groove being segmented into an outer side in tire radial direction and an inner side in tire radial direction by drawing an imaginary segment line parallel with a straight line connecting each of groove opening edges at a position of ½ of a groove depth in a meridian cross-section, a cross-sectional area SU on the outer side in tire radial direction and a cross-sectional area SD on the inner side in tire radial direction satisfying the relationship 0.15≤SD/SU≤0.60, the circumferential main groove having a zigzag shape that bends in a tire width direction, and the circumferential main groove having a pitch length P1 of one period of the zigzag shape and a tire circumferential length TL in the tire circumferential direction satisfying a relationship 0.005≤P1/TL≤0.019;

a plurality of circumferential main grooves provided side by side in the tire width direction;

a plurality of lug grooves provided side by side in the tire circumferential direction to connect mutual bent portions of the zigzag shape closest in the tire width direction with respect to two of the plurality of circumferential main grooves adjacent to each other in the tire width direction; and a block defined by the two of the plurality of circumferential main grooves adjacent to each other in the tire width direction and two of the plurality of lug grooves adjacent to each other in the tire circumferential direction, wherein one of the plurality of circumferential main grooves defining the block is disposed closer to a tire equatorial plane, and the other of the plurality of circumferential main grooves is disposed closer to a tire ground contact edge, the block includes notch portions respectively connected to each of the plurality of circumferential main grooves on both sides in the tire width direction and terminating inside the block, each of the notch portions comprising an inclined portion that is inclined with respect to a normal line of the tread surface toward a groove bottom of each of the circumferential main grooves, and each of the inclined portions having inclination angles, where a notch connected to the one of the plurality of circumferential main grooves has an inclination angle θC toward a groove bottom of the one of the plurality of circumferential main grooves and a notch connected to the other of the plurality of circumferential main grooves has an inclination angle θS toward a groove bottom of the other of the plurality of circumferential main grooves that satisfy the relationships θC≤20° and θC<θS.

2. The pneumatic tire according to claim 1, wherein an imaginary segment line is drawn at a ¼ position of the groove depth in a meridian cross-section, the circumferential main groove has a groove width W1 at the ¼ position and a groove width W of the groove opening portion, and satisfies the relationship W1/W≤0.78.

3. The pneumatic tire according to claim 1, wherein the circumferential main groove comprises in at least one groove wall, an inflection portion where a groove wall angle changes from the groove opening edge toward a groove bottom.

4. The pneumatic tire according to claim 3, wherein the circumferential main groove has a height HT in the tire radial direction from the groove bottom to the inflection portion and a groove depth D, and satisfies the relationship $0.1 \leq HT/D \leq 0.5$.

5. The pneumatic tire according to claim 1, wherein, in the circumferential main groove, the groove wall angle with respect to a normal line of the tread surface from the groove opening edge of the groove wall toward the groove bottom satisfies the range of not less than 10° and not greater than 45°.

6. The pneumatic tire according to claim 1, wherein the circumferential main groove has an amplitude A of one period of the zigzag shape and a tire development width TDW, and satisfies the relationship $0.01 \leq A/TDW \leq 0.05$.

7. The pneumatic tire according to claim 1, comprising a plurality of the circumferential main grooves provided side by side in the tire width direction, wherein positions of bent portions of the zigzag shape of each of the plurality of circumferential main grooves adjacent to each other in the tire width direction differ from each other in the tire circumferential direction.

8. The pneumatic tire according to claim 1, wherein the block comprises one broad width portion at the center in the tire circumferential direction and narrow width portions respectively at both ends in the tire circumferential direction.

9. The pneumatic tire according to claim 1, wherein each of the plurality of lug grooves includes bent portions at at least two positions.

10. The pneumatic tire according to claim 1, wherein a groove depth DL of each of the plurality of lug grooves and a groove depth D of each of the plurality of circumferential main grooves to which each of the plurality of lug grooves connects satisfy the relationship $DL/D \leq 0.8$.

11. The pneumatic tire according to claim 1, wherein the block comprises notch portions respectively connected to each of the plurality of circumferential main grooves on both sides in the tire width direction and terminating inside the block,
   each of the notch portions comprising opening portions that respectively connect to the plurality of circumferential main grooves and are disposed to be misaligned in the tire circumferential direction, and
   an edge of an opening portion of one of the notch portions on one side in the tire width direction aligning in the tire circumferential direction with an edge of an opening portion of another one of the notch portions on another side in the tire width direction.

12. The pneumatic tire according to claim 1, wherein the block includes notch portions respectively connected to each of the plurality of circumferential main grooves on both sides in the tire width direction and terminating inside the block,
   each of the notch portion being provided to face one end of each of the plurality of lug grooves across each of the plurality of circumferential main grooves.

13. The pneumatic tire according to claim 1, wherein the maximum height DK of each of the notch portions in the tire radial direction and the groove depth D of each of the plurality of circumferential main grooves to which each of the notch portions connects satisfy the relationship $0.60 \leq DK/D \leq 0.85$.

14. The pneumatic tire according to claim 1, wherein the circumferential main groove comprises a step portion formed in a groove wall at least on a side to which each of the plurality of lug grooves connects,
   a groove depth DL of each of the plurality of lug grooves and a depth DH of the step portion from the tread surface satisfying the relationship $DL/DH \leq 1.1$.

15. The pneumatic tire according to claim 1, wherein, when the circumferential main groove is provided on an outermost side in the tire width direction, a groove that continues from the circumferential main groove to a tire ground contact edge closest to the circumferential main groove is not disposed on the outer side in the tire width direction of the circumferential main groove.

* * * * *